United States Patent
Nagano et al.

(10) Patent No.: US 7,880,772 B2
(45) Date of Patent: Feb. 1, 2011

(54) IMAGING APPARATUS AND METHOD FOR APPROXIMATING COLOR MATCHING FUNCTIONS

(75) Inventors: Takahiro Nagano, Kanagawa (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 734 days.

(21) Appl. No.: 11/745,143

(22) Filed: May 7, 2007

(65) Prior Publication Data

US 2007/0268377 A1 Nov. 22, 2007

(30) Foreign Application Priority Data

May 15, 2006 (JP) ............... 2006-135125

(51) Int. Cl.
*H04N 5/228* (2006.01)
*H04N 3/14* (2006.01)

(52) U.S. Cl. ............... 348/223.1; 348/222.1; 348/273; 348/280; 358/516; 382/167

(58) Field of Classification Search ............... 348/223.1
See application file for complete search history.

(56) References Cited

U.S. PATENT DOCUMENTS

| | | | |
|---|---|---|---|
| 5,063,439 A * | 11/1991 | Tabei | .......... 348/272 |
| 6,771,314 B1 * | 8/2004 | Bawolek et al. | .......... 348/272 |
| 6,822,677 B1 * | 11/2004 | Takahashi | .......... 348/223.1 |
| 7,586,528 B2 * | 9/2009 | Fukunaga et al. | .......... 348/274 |
| 7,633,537 B2 * | 12/2009 | Hoshuyama | .......... 348/272 |
| 2003/0169354 A1 * | 9/2003 | Aotsuka | .......... 348/272 |
| 2006/0082665 A1 * | 4/2006 | Mizukura et al. | .......... 348/272 |

FOREIGN PATENT DOCUMENTS

| | | |
|---|---|---|
| CN | 1300504 A | 6/2001 |
| CN | 1643936 A | 7/2005 |
| JP | 2005-136765 | 5/2005 |

\* cited by examiner

*Primary Examiner*—Ngoc-Yen T Vu
(74) *Attorney, Agent, or Firm*—Oblon, Spivak, McClelland, Maier & Neustadt, L.L.P.

(57) ABSTRACT

An imaging apparatus includes: an imaging section configured to approximate one of color matching functions representing sensitivity of the human eye to color by a spectral sensitivity that is obtained as a difference in output between, from among mutually adjacent photoelectric conversion elements, the photoelectric conversion elements arranged at predetermined positions, the imaging section having the photoelectric conversion elements arranged at the predetermined positions; and a signal processing section configured to apply to an output of the imaging section signal processing for converting an output of a photoelectric conversion element into a signal of a color image.

13 Claims, 26 Drawing Sheets

FIG. 1 RELATED ART

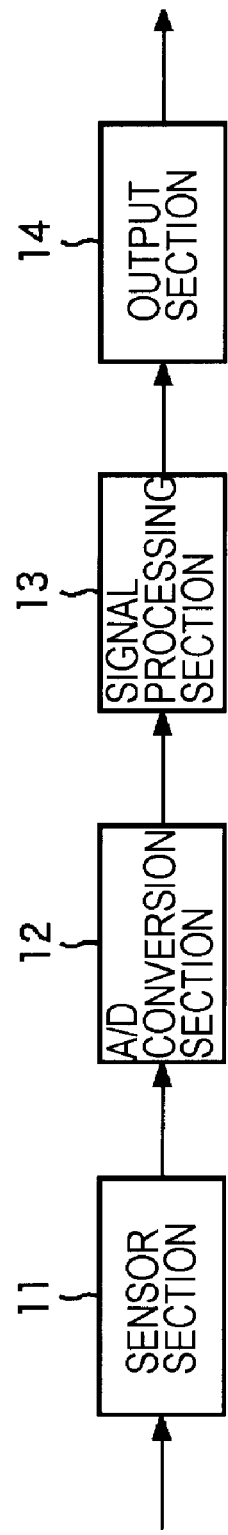
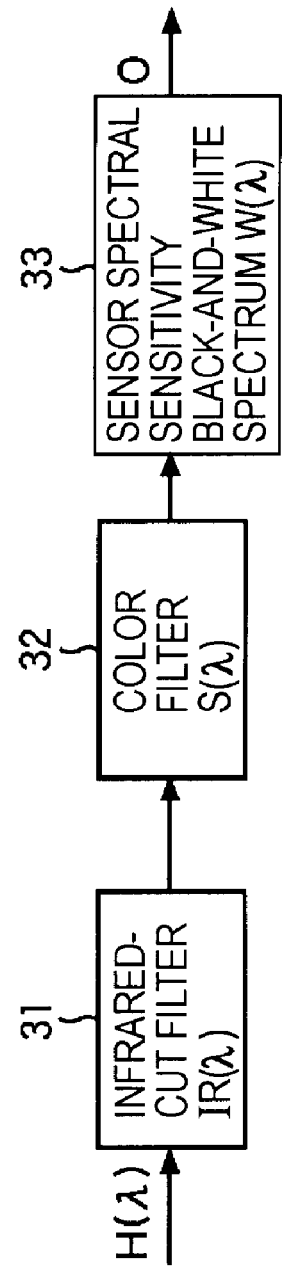

IMAGING APPARATUS AND METHOD FOR APPROXIMATING COLOR MATCHING FUNCTIONS

CROSS REFERENCES TO RELATED APPLICATIONS

The present invention contains subject matter related to Japanese Patent Application JP 2006-135125 filed in the Japanese Patent Office on May 15, 2006, the entire contents of which are incorporated herein by reference.

BACKGROUND OF THE INVENTION

1. Field of the Invention

The present invention relates to an imaging apparatus and method, and an imaging device. More specifically, the present invention relates to an imaging apparatus and method, and an imaging device that enable photographing of a more accurate color image.

2. Description of the Related Art

Digital still cameras and digital video cameras for photographing color images have been widely used to date.

When photographing a color image using a single-chip imaging device, a plurality of kinds of color filter respectively transmitting light of different colors are arranged in the Bayer arrangement shown in FIG. 1 in the respective photoelectric conversion elements of the imaging device.

Of the three primary colors of light, the spectral characteristic of a color filter in this case is one corresponding to either one of red indicated as R in FIG. 1, green indicated as G in FIG. 1, or blue indicated as B in FIG. 1.

The color filter is a so-called primary color filter. Other than this, a complementary color filter is also used. In a complementary color filter, the difference between the luminance and R, the difference between the luminance and G, and the difference between the luminance and B are detected.

Further, in the related art, there has been proposed a technique according to which, in a line in which G exists, the G interpolation processing section interpolates G at a pixel position in the line where G does not exist by using adjacent G's on the left and right sides, and in a line in which E exists, at a pixel position in the line where E does not exit, the E interpolation processing section interpolates adjacent E's on the left and right sides. The all-color interpolation processing section calculates an interpolation value C of R, G, B, E at a focus pixel position by using the luminance signal L and the mosaic signal M, the G+E generation processing section generates a new color component G+E on the basis of the mosaic signal M, and the all-color interpolation processing section calculates an interpolation value C' of R, G, B, E at a focus pixel position on the basis of the color component G+E and the mosaic signal M (see, for example, Japanese Unexamined Patent Application Publication No. 2005-136765).

SUMMARY OF THE INVENTION

However, in imaging apparatuses of the related art, the spectral characteristics of an infrared-cut filter, color filter, and photoelectric conversion elements, and the subsequent signal processing are individually examined. Accordingly, the imaging portion and the signal processing are individually optimized and not optimized in their totality.

In this regard, the spectral characteristic of a color filter is a factor determining many characteristics relating to the color of an image. The spectral characteristic of a color filter is optimized for, for example, each of the primary colors of RGB.

However, the spectral characteristic of a color filter largely deviates from the ideal color matching function.

This is due to the following two reasons.

First, a color matching function includes negative sensitivity depending on the coordinate system. It is not possible to physically realize negative sensitivity.

Second, since a color filter must be mounted on a single-chip photoelectric conversion element, pigments that satisfy constraints imposed by the necessity of mounting the color filter on a single-chip photoelectric conversion element, specifically, constraints on such characteristics as the density, film thickness limit, light resistance, and heat resistance are limited. It is thus extremely difficult to realize a spectral characteristic approximate to the color matching function.

FIG. 2 is a diagram showing an example of the spectral characteristics of RGB color filters, and the color matching functions for RGB. In FIG. 2, the white circle represents the spectral characteristic of a B color filter, the white triangle represents the spectral characteristic of a G color filter, and the white square represents the spectral characteristic of an R color filter.

In FIG. 2, the dotted line represents the color matching function of B, the one-dot chain line represents the color matching function of G, and the two-dot chain line represents the color matching function of R.

As shown in FIG. 2, the color matching functions of B, G, and R include negative sensitivity.

Comparing the spectral characteristic of the B color filter with the color matching function of B, in the entire frequency band from 400 nm to 550 nm, the sensitivity of the spectral characteristic of the color filter is larger than that of the color matching function. Comparing the spectral characteristic of the G color filter with the color matching function of G, in the entire frequency band from 400 nm to 550 nm, in particular, the sensitivity of the spectral characteristic of the color filter is larger than that of the color matching function. Further, comparing the spectral characteristic of the R color filter with the color matching function of R, in the entire frequency band from 630 nm to 700 nm, in particular, the sensitivity of the spectral characteristic of the color filter is larger than that of the color matching function.

As compared with a color matching function having negative sensitivity, the actual color filter cannot realize negative sensitivity due to physical constraints, so deviation always occurs at the portion of negative sensitivity.

An image photographed by using color filters of such spectral characteristics is represented by colors inside a triangle on the chromaticity diagram with R, G, B at the vertices. In this case, a color in the area outside the triangle is degenerated into a color inside the triangle. Accordingly, colors represented at respective positions of reference coordinates of the photographed image deviate from the colors at respective positions of the coordinates on the chromaticity diagram. Images obtained according to the related art thus contain errors, which presents a problem in terms of the reproducibility of color.

It is thus desirable to allow an image with more accurate color reproduction to be captured.

According to an embodiment of the present invention, there is provided an imaging apparatus including: imaging means for approximating one of color matching functions representing sensitivity of the human eye to color by a spectral sensitivity that is obtained as a difference in output between, from among mutually adjacent photoelectric conversion elements, the photoelectric conversion elements arranged at predetermined positions, the imaging means having the photoelectric conversion elements arranged at the predetermined positions; and signal processing means for applying to an output of the imaging means signal processing for converting an output of a photoelectric conversion element into a signal of a color image.

The imaging apparatus may be configured such that: a spectral sensitivity obtained as a difference between outputs of a first photoelectric conversion element and a second photoelectric conversion element of four photoelectric conversion elements arranged adjacent to each other vertically and horizontally on the imaging means approximates a first color matching function of color matching functions for three primary colors of light; a spectral sensitivity obtained as a difference between outputs of a third photoelectric conversion element and the first photoelectric conversion element of the four photoelectric conversion elements approximates a second color matching function of color matching functions for three primary colors of light; and a spectral sensitivity obtained as a difference between outputs of a fourth photoelectric conversion element and the first photoelectric conversion element of the four photoelectric conversion elements approximates a third color matching function of color matching functions for three primary colors of light.

The imaging apparatus may be configured such that the imaging means includes units arranged side by side vertically or horizontally, the units each including the first photoelectric conversion element, the second photoelectric conversion element, the third photoelectric conversion element, and the fourth photoelectric conversion element that are arranged adjacent to each other vertically and horizontally.

The imaging apparatus may be configured such that the signal processing means includes: first calculating means for calculating, for each one of the first photoelectric conversion elements and with respect to the second photoelectric conversion element, the third photoelectric conversion element, and the fourth photoelectric conversion element that are adjacent to the first photoelectric conversion element, a difference between an output of the first photoelectric conversion element and an output of the second photoelectric conversion element, a difference between an output of the first photoelectric conversion element and an output between the third photoelectric conversion element, and a difference between an output of the first photoelectric conversion element and an output of the fourth photoelectric conversion element; determining means for determining a position of a pixel of a color image whose pixel value is to be calculated, from among positions shifted to the upper left, lower left, upper right, and lower right with respect to a position of the first photoelectric conversion element by half a distance of two photoelectric conversion elements in the imaging means; and second calculating means for calculating a pixel value of a pixel of a color image by performing, in accordance with a determination result, a weighted average between a difference calculated from an output of the first photoelectric conversion element that is shifted by half the distance with respect to a position of the pixel of the color image, and a difference calculated from an output of another one of the first photoelectric conversion elements which belongs to another unit adjacent to a unit to which the first photoelectric conversion element belongs.

The imaging apparatus may be configured such that the imaging means has arranged thereon photoelectric conversion elements from which a spectral sensitivity that approximates one of color matching functions for RGB is outputted on the basis of a difference in output between the photoelectric conversion elements.

The imaging apparatus may be configured such that the imaging means has arranged thereon photoelectric conversion elements from which a spectral sensitivity that approximates one of color matching functions in an XYZ calorimetric system is outputted on the basis of a difference in output between the photoelectric conversion elements.

The imaging apparatus may be configured such that the signal processing means applies signal processing to an output of the imaging means, the signal processing including calculating, as a signal of a color image, a difference between outputs of photoelectric conversion elements arranged at predetermined positions, from among photoelectric conversion elements arranged adjacent to each other on the imaging means.

The imaging apparatus may be configured such that the signal processing means applies signal processing to an output of the imaging means, the signal processing being class classification adaptive processing using coefficients for individual classes found in advance.

The imaging apparatus may be configured such that the imaging apparatus further includes adjusting means for adjusting a white balance of an output of a photoelectric conversion element of the imaging means.

The imaging apparatus may be configured such that the imaging apparatus further includes adjusting means for adjusting a white balance of a signal of a color image obtained by signal processing.

According to an embodiment of the present invention, there is provided an imaging method including the steps of: arranging photoelectric conversion elements at predetermined adjacent positions of the imaging means, the photoelectric conversion elements approximating one of color matching functions representing sensitivity of the human eye to color by a spectral sensitivity obtained as a difference in output between the photoelectric conversion elements; and applying to an output of the imaging means signal processing for converting an output of a photoelectric conversion element into a signal of a color image.

According to an embodiment of the present invention, there is provided an imaging device including photoelectric conversion elements arranged at predetermined adjacent positions, the photoelectric conversion elements approximating one of color matching functions representing sensitivity of the human eye to color by a spectral sensitivity obtained as a difference in output between the photoelectric conversion elements.

The imaging device may be configured such that: a spectral sensitivity obtained as a difference between outputs of a first photoelectric conversion element and a second photoelectric conversion element of four photoelectric conversion elements arranged adjacent to each other vertically and horizontally approximates a first color matching function of color matching functions for three primary colors of light; a spectral sensitivity obtained as a difference between outputs of a third photoelectric conversion element and the first photoelectric conversion element of the four photoelectric conversion elements approximates a second color matching function of color matching functions for three primary colors of light; and a spectral sensitivity obtained as a difference between outputs of a fourth photoelectric conversion element and the first photoelectric conversion element of the four photoelectric conversion elements approximates a third color matching function of color matching functions for three primary colors of light.

The imaging device may be configured such that the imaging device includes units arranged side by side vertically or horizontally, the units each including the first photoelectric conversion element, the second photoelectric conversion element, the third photoelectric conversion element, and the fourth photoelectric conversion element that are arranged adjacent to each other vertically and horizontally.

In the imaging apparatus and method according to the embodiment of the present invention described above, photoelectric conversion elements, which approximate one of color matching functions representing sensitivity of the human eye to color by a spectral sensitivity obtained as a difference in output between the photoelectric conversion elements, are arranged at predetermined adjacent positions of the imaging means, and signal processing for converting an output of a photoelectric conversion element into a signal of a color image is applied to an output of the imaging means signal processing.

In the imaging device according to the embodiment of the present invention described above, photoelectric conversion elements, which approximate one of color matching functions representing sensitivity of the human eye to color by a spectral sensitivity obtained as a difference in output between the photoelectric conversion elements, are arranged at predetermined adjacent positions.

As described above, the imaging apparatus and method according to the embodiment of the present invention described above make it possible to capture a color image.

Further, the imaging apparatus and method according to the embodiment of the present invention described above make it possible to capture an image with more accurate color reproduction.

The imaging device according to the embodiment of the present invention as described above makes it possible to capture a color image.

Further, the imaging device according to the embodiment of the present invention as described above makes it possible to capture an image with more accurate color reproduction.

BRIEF DESCRIPTION OF THE DRAWINGS

Figure 1:
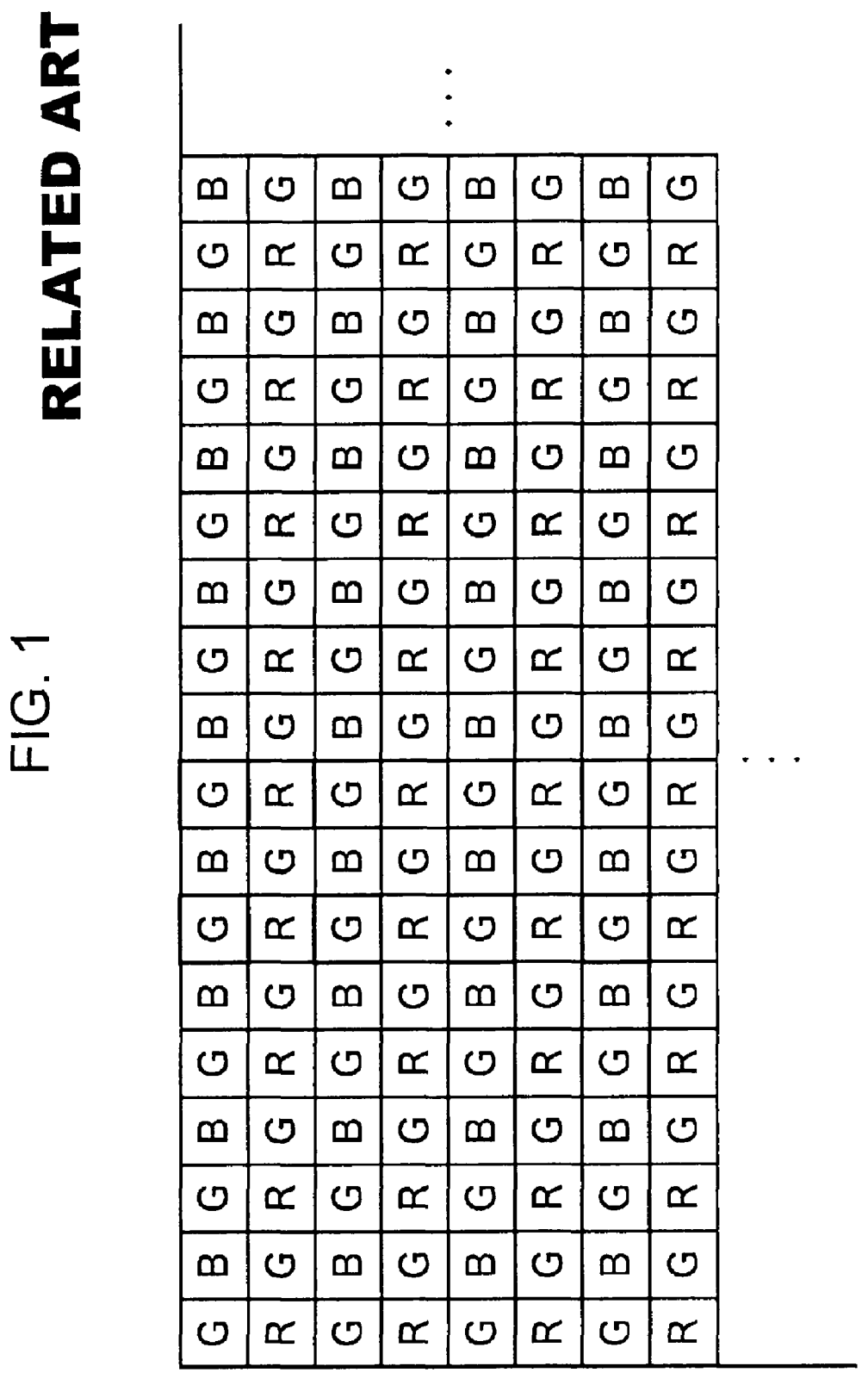

FIG. 1 is a diagram showing the Bayer arrangement;

FIG. 3 is a block diagram showing the configuration of an imaging apparatus according to an embodiment of the present invention;

FIG. 4 is a block diagram illustrating systems in a sensor section which affect spectral characteristics;

DESCRIPTION OF THE PREFERRED EMBODIMENTS

Before describing an embodiment of the present invention, the correspondence between the features of the present invention and embodiments disclosed in this specification and drawings is discussed below. This description is intended to assure that an embodiment(s) supporting the present invention are described in this specification and drawings. Thus, even if an embodiment in the following description is not described as relating to a certain feature of the present invention, that does not necessarily mean that the embodiment does not relate to that feature of the present invention. Conversely, even if an embodiment is described herein as relating to a certain feature of the present invention, that does not necessarily mean that the embodiment does not relate to other features of the present invention.

An imaging apparatus according to an embodiment of the present invention includes: imaging means (for example, a sensor section 11 in FIG. 3) for approximating one of color matching functions representing sensitivity of the human eye to color by a spectral sensitivity that is obtained as a difference in output between, from among mutually adjacent photoelectric conversion elements, the photoelectric conversion elements arranged at predetermined positions, the imaging means having the photoelectric conversion elements (for example, pixels in FIG. 5) arranged at the predetermined positions; and signal processing means (for example, a signal processing section 13 in FIG. 3) for applying to an output of the imaging means signal processing for converting an output of a photoelectric conversion element into a signal of a color image.

Figure 10:
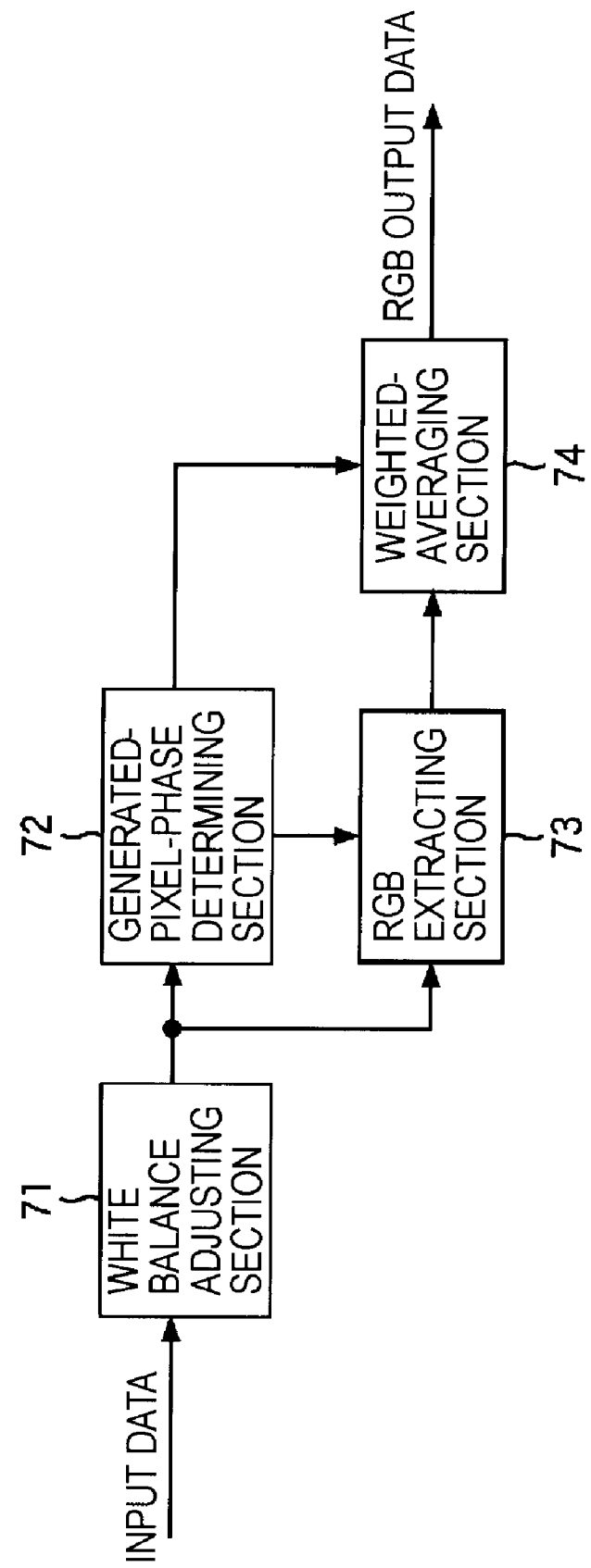
FIG. 10 is a block diagram showing an example of the configuration of a signal processing section.

The imaging apparatus may be configured such that the signal processing means includes: first calculating means (for example, an RGB extracting section 73 in FIG. 10) for calculating, for each one of the first photoelectric conversion elements and with respect to the second photoelectric conversion element, the third photoelectric conversion element, and the fourth photoelectric conversion element that are adjacent to the first photoelectric conversion element, a difference between an output of the first photoelectric conversion element and an output of the second photoelectric conversion element, a difference between an output of the first photoelectric conversion element and an output between the third photoelectric conversion element, and a difference between an output of the first photoelectric conversion element and an output of the fourth photoelectric conversion element; determining means (for example, a generated-pixel-phase determining section 72 in FIG. 10) for determining a position of a pixel of a color image whose pixel value is to be calculated, from among positions shifted to the upper left, lower left, upper right, and lower right with respect to a position of the first photoelectric conversion element by half a distance of two photoelectric conversion elements in the imaging means; and second calculating means (for example, a weighted-averaging section 74 in FIG. 10) for calculating a pixel value of a pixel of a color image by performing, in accordance with a determination result, a weighted average between a difference calculated from an output of the first photoelectric conversion element that is shifted by half the distance with respect to a position of the pixel of the color image, and a difference calculated from an output of another one of the first photoelectric conversion elements which belongs to another unit adjacent to a unit to which the first photoelectric conversion element belongs.

The imaging apparatus may be configured such that the imaging apparatus further includes adjusting means (for example, a white balance adjusting section 71 in FIG. 10) for adjusting a white balance of an output of a photoelectric conversion element of the imaging means.

The imaging apparatus may be configured such that the imaging apparatus further includes adjusting means (for example, a white balance adjusting section 91 in FIG. 13) for adjusting a white balance of a signal of a color image obtained by signal processing.

Figure 5:
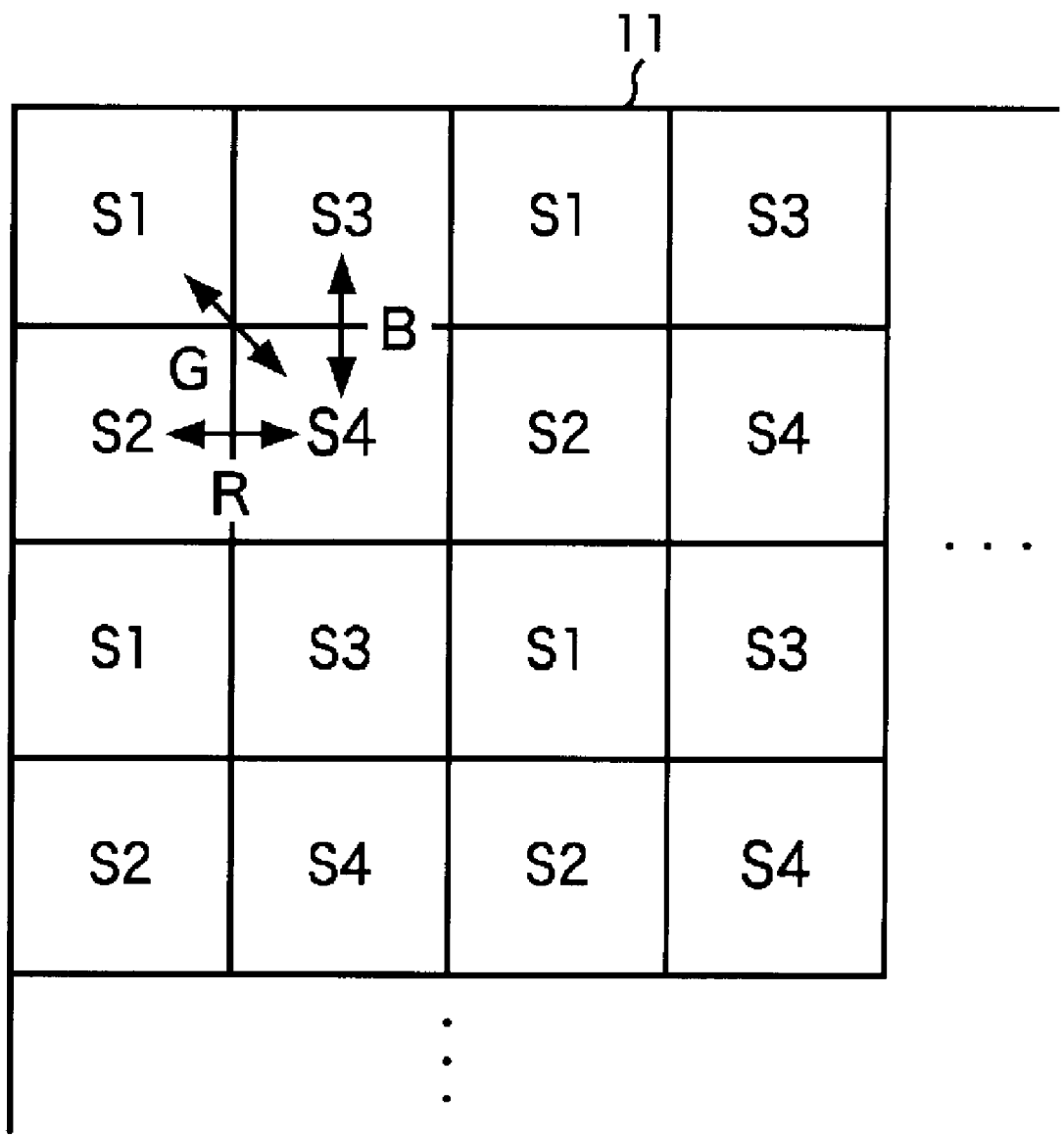
FIG. 5 is a diagram showing an example of the arrangement of pixels in the sensor section.
Figure 12:
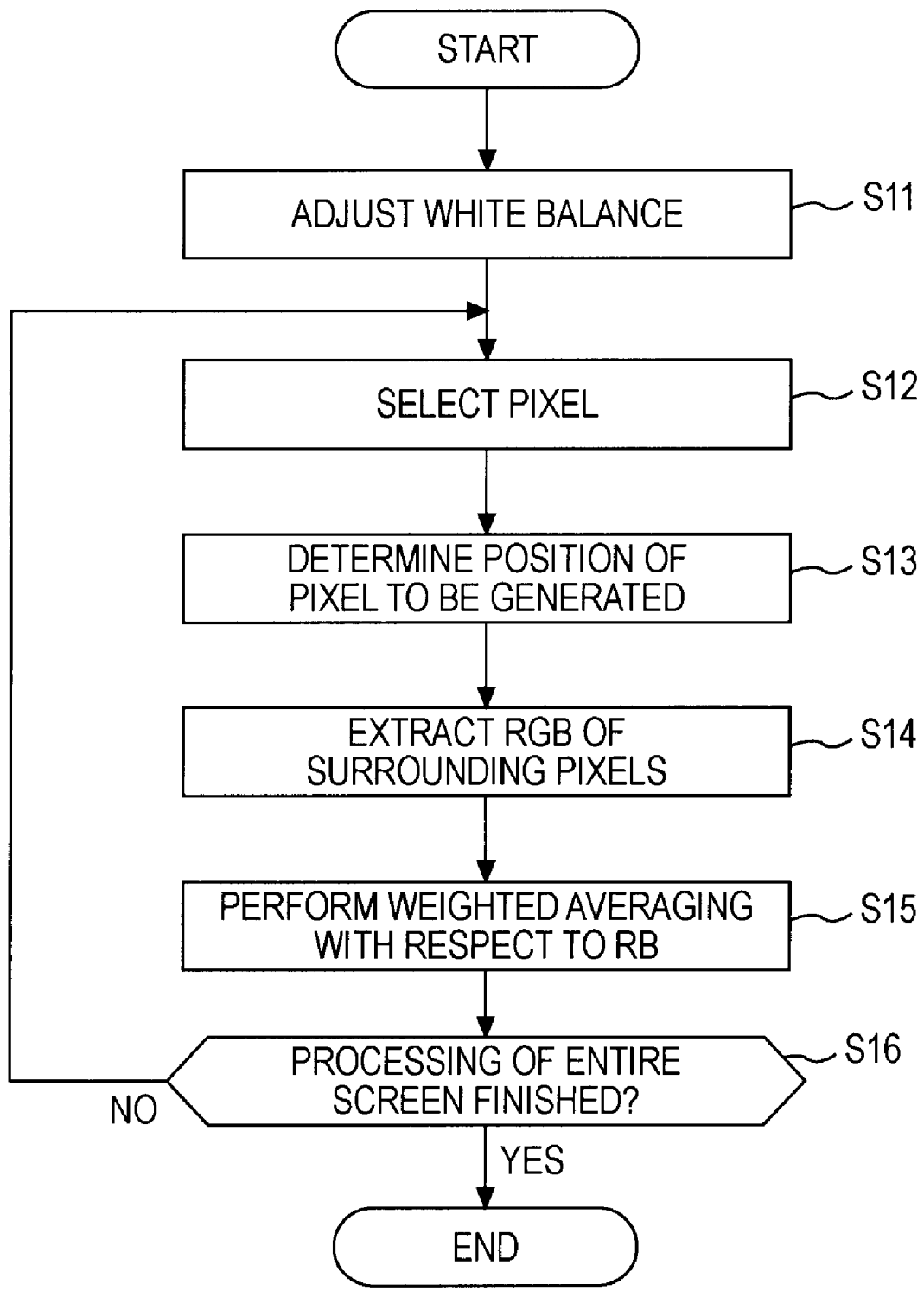
FIG. 12 is a flow chart illustrating an example of signal processing by the signal processing section.

An imaging method according to an embodiment of the present invention includes the steps of: arranging photoelectric conversion elements at predetermined adjacent positions of the imaging means, the photoelectric conversion elements approximating one of color matching functions representing sensitivity of the human eye to color by a spectral sensitivity obtained as a difference in output between the photoelectric conversion elements (for example, arranging pixels in the manner as shown in FIG. 5); and applying to an output of the imaging means signal processing for converting an output of a photoelectric conversion element into a signal of a color image (for example, steps S12 to S14 in FIG. 12).

An imaging device (for example, a sensor section 11 in FIG. 3) according to an embodiment of the present invention includes photoelectric conversion elements (for example, pixels in FIG. 5) arranged at predetermined adjacent positions, the photoelectric conversion elements approximating one of color matching functions representing sensitivity of the human eye to color by a spectral sensitivity obtained as a difference in output between the photoelectric conversion elements.

FIG. 3 is a block diagram showing the configuration of an imaging apparatus according to an embodiment of the present invention. The imaging apparatus includes a sensor section 11, an A/D (Analog to Digital) conversion section 12, a signal processing section 13, and an output section 14.

The sensor section 11 represents an example of an imaging device that converts an optical image into an electrical signal of an image. The sensor section 11 is formed by, for example, a CCD (Charge Coupled Devices) or CMOS (complementary Metal Oxide Semiconductor) image sensor. The sensor section 11 has photoelectric conversion elements arranged at predetermined positions such that a spectral sensitivity obtained as a difference between the outputs of, from among a plurality of photoelectric conversion elements, the photoelectric conversion elements arranged at the predetermined positions approximates one of the color matching functions representing the sensitivity of the human eye to color. In other words, in the sensor section 11, photoelectric conversion elements for approximating one of the color matching functions representing the sensitivity of the human eye to color by a difference in output between the photoelectric conversion elements are arranged at predetermined adjacent positions.

The sensor section 11 supplies an image signal obtained by photoelectric conversion to the A/D conversion section 12.

The A/D conversion section 12 converts the image signal supplied from the sensor section 11, which is an analog signal, into a digital signal. The A/D conversion section 12 supplies the digital signal obtained by the conversion to the signal processing section 13.

The signal processing section 13 applies various kinds of signal processing to the digital image signal supplied from the A/D conversion section 12. For example, the signal processing section 13 applies the signal processing of converting an output of a photoelectric conversion element into a color image signal, to the image signal that is an output of the sensor section 11.

The signal processing section 13 supplies to the output section 14 the image signal to which signal processing has been applied. The output section 14 outputs in a predetermined format the image signal supplied from the signal processing section 13.

In the imaging apparatus shown in FIG. 3, more accurate and broader range color reproduction of an image is achieved in totality through the system from the sensor section 11 that captures an image to the signal processing section 13 and output section 14 that process and output a signal. The imaging apparatus shown in FIG. 3 can be roughly divided into two, namely the sensor section 11 with optimized spectral characteristics and the signal processing section 13 that is located downstream.

FIG. 4 is a block diagram illustrating systems in the sensor section 11 which affect spectral characteristics.

Systems in the sensor section 11 which affect spectral characteristics can be represented by an infrared-cut filter 31, a color filter 32, and a sensor spectral sensitivity 33. The infrared-cut filter 31 blocks infrared rays. The color filter 32 is endowed with a spectral characteristic corresponding to each of the primary colors. The sensor spectral sensitivity 33 represents the characteristic of the photoelectric conversion of the sensor section 11 itself.

Assuming that the input light to the sensor section 11 is $H(\lambda)$, the spectral characteristic of the infrared-cut filter 31 is $IR(\lambda)$, and the black-and-white spectral characteristic of an image sensor is $W(\lambda)$, the total sensitivity characteristic $T(\lambda)$ of the sensor section 11 is represented by Expression (1).

$$T(\lambda) = IR(\lambda) \cdot S(\lambda) \cdot W(\lambda) \quad (1)$$

The pixel value 0 outputted from each pixel, that is, a photoelectric conversion element, of the sensor section 11 is represented by Expression (2)

$$0 = \int H(\lambda) \cdot T(\lambda) d\lambda \quad (2)$$

A case is considered in which, in order to optimize the total sensitivity characteristic T(λ) of the sensor section 11 represented by Expression (1), the spectral characteristic S(λ) of the color filter 32, and the spectral characteristic IR(λ) of the infrared-cut filter 31 are changed.

Figure 2:
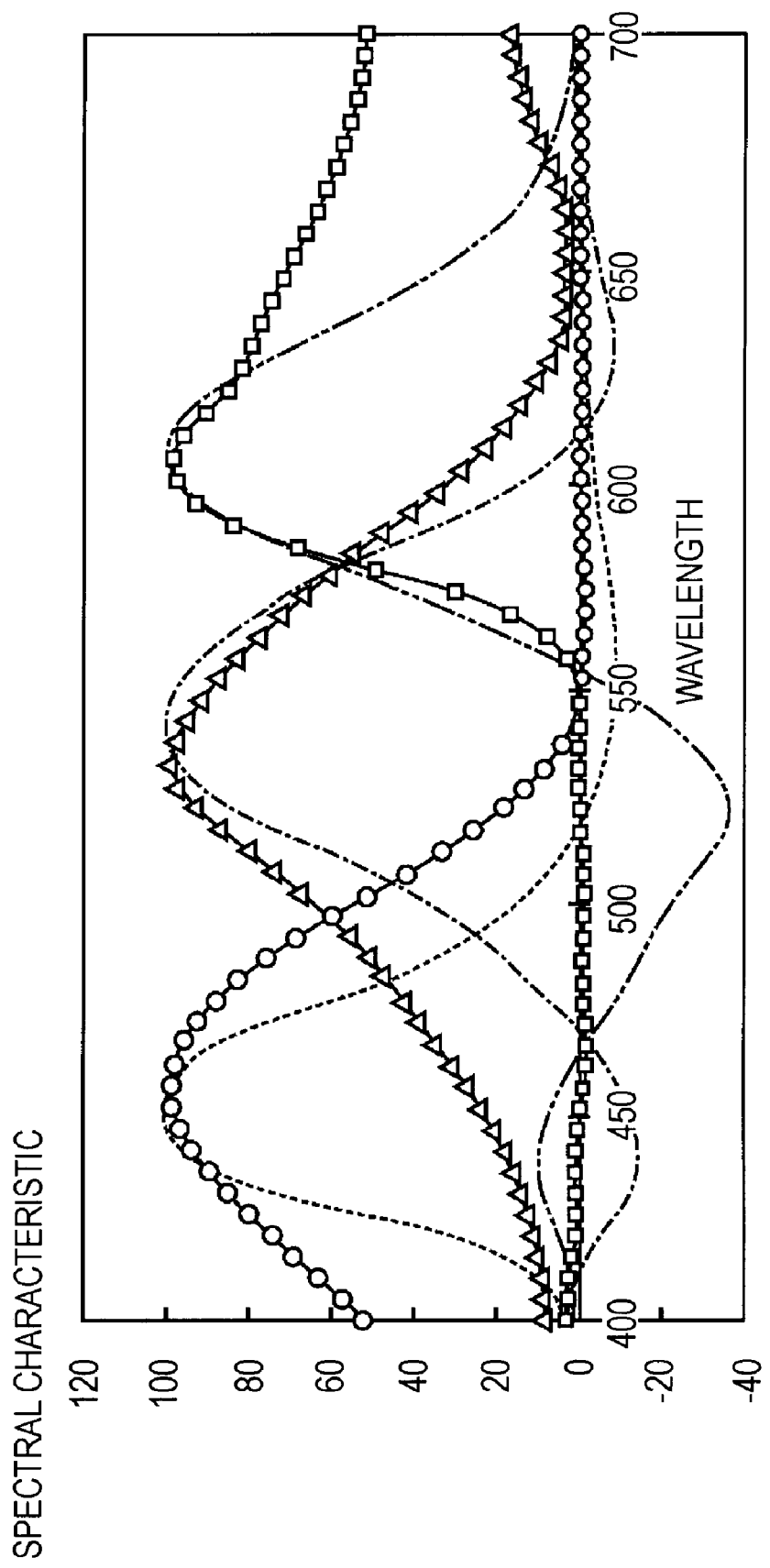
FIG. 2 is a diagram showing an example of the spectral characteristics of RGB color filters, and the color matching functions for RGB.

Due to such physical constraints as the limited number of pigments that can be used for a filter that can be mounted on the sensor section 11 that is an image sensor, or the it is not possible to realize negative sensitivity, with the technique according to the related art in which optimization is performed individually for each of RGB, as shown in FIG. 2, only spectral characteristics that are largely deviated from the color matching functions can be realized.

In view of this, by using the combination of the following two techniques, the spectral characteristic S(λ) of the color filter 32, and the spectral characteristic IR(λ) of the infrared-cut filter 31 are adjusted so that the spectral characteristics that are realized as a result become more approximated to the color matching functions.

The first technique is an increase in color variation. By increasing the color variation of the color filter 32 of the sensor section 11 from three colors to a greater number of colors, greater approximation to the color matching functions can be realized as a whole.

The second technique is a difference method. Instead of approximating the characteristic of each color of the color filter 32 to the color matching function, the difference in output between pixels of predetermined spectral characteristics, that is, photoelectric conversion elements, is approximated to the color matching function.

The use of the two techniques mentioned above increases the degree of freedom in performing the optimization for approximating the finally obtained spectral characteristics to the color matching functions by using a limited number of pigments. As a result, as compared with the case in which optimization is individually performed for each of the three colors of RGB under the same conditions, it is possible to realize improved color reproducibility.

Further, by using the difference between the outputs of two pixels, even when the outputs of the respective pixels do not have negative sensitivity but have only positive sensitivity, it is possible to realize negative sensitivity and hence a spectral characteristic that is more approximate to the color matching function which has negative sensitivity.

FIG. 5 is a diagram showing the arrangement of the pixels of the sensor section 11. In FIG. 5, each square represents a pixel. A pixel S1, a pixel S2, a pixel S3, and a pixel S4 each represent one pixel of the sensor section 11, that is, one photoelectric conversion element.

Hereinafter, the outputs of the pixels S1, S2, S3, and S4 will be simply referred to as S1, S2, S3, and S4.

In the example of the sensor section 11 shown in FIG. 5, the respective color matching functions of the spectral characteristics of three desired colors, for example, RGB in the RGB calorimetric system, are approximated by the differences between the outputs of the pixels S1, S2, S3, and S4. For example, R, G, B are calculated as follows by Expression (3).

$$R = S4 - S2$$

$$G = S4 - S1$$

$$B = S4 - S3 \quad (3)$$

Figure 6:
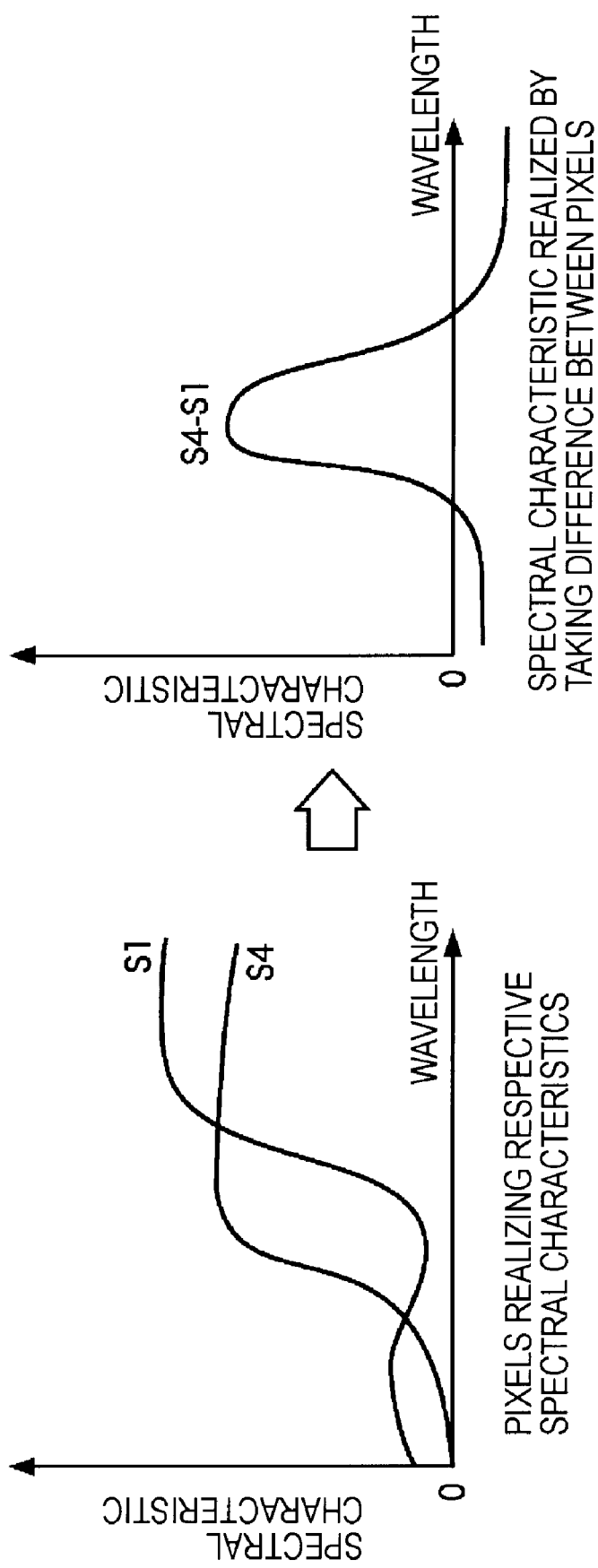
FIG. 6 is a diagram illustrating the spectral characteristic realized by a difference.

That is, as shown in, for example, FIG. 6, even if only S1 and S4 are positive values, by calculating S4−S1, a negative value can be realized as the value of G.

In this regard, R, G, B can be accurately calculated from Expression (3) if the outputs of the pixels S1, S2, S3, and S4 around the pixel to be finally calculated are uniform. However, there are generally variations in the outputs of the pixels S1, S2, S3, and S4, and thus it is necessary to obtain more accurate R, G, B by means of the signal processing section 13.

Next, the specific spectral characteristics of the infrared-cut filter 31 and color filter 32 will be described.

Figure 7:
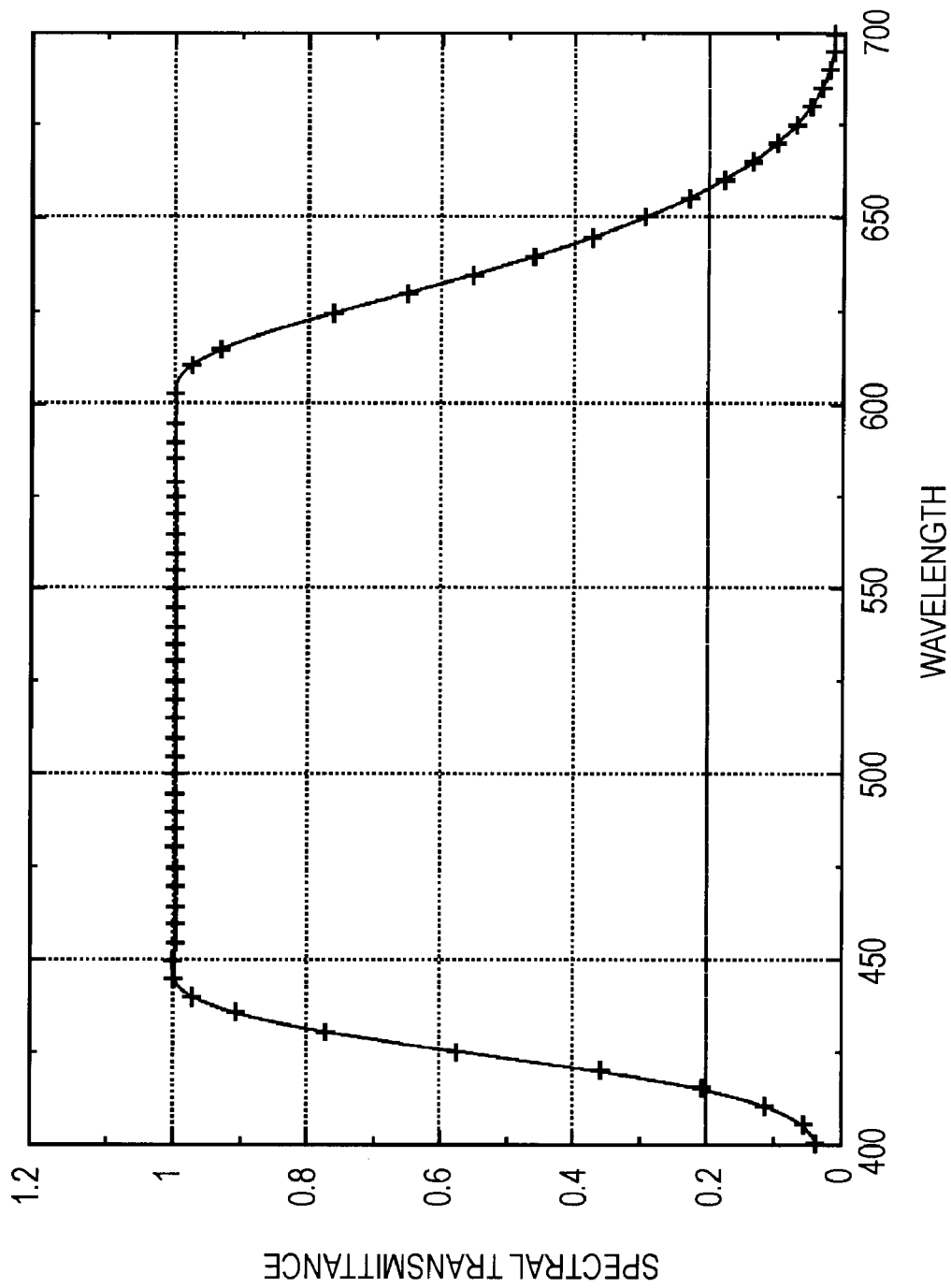
FIG. 7 is a diagram showing an example of the spectral characteristic IR($\lambda$) of an infrared-cut filter.

FIG. 7 is a diagram showing an example of the spectral characteristic IR(λ) of the infrared-cut filter 31. Since the infrared-cut filter 31 is free from the constraint that it has to be mounted on the sensor section 11, the infrared-cut filter 31 can be provided, for example, in front or in rear of an optical system for forming the optical image of a subject on the sensor section 11. The spectral characteristic IR(λ) of the infrared-cut filter 31 can be thus changed relatively freely.

That is, the spectral characteristic IR(λ) of the infrared-cut filter 31 may be changed in accordance with the characteristics of the group of pigments used for the color filter 32.

In the spectral characteristic IR(λ) of the infrared-cut filter 31 shown in FIG. 7, relatively sharp attenuation of spectral transmittance occurs on the short wavelength side of 440 nm or less and on the long wavelength side of 610 nm or more. That is, the spectral transmittance is 1.0 at 445 nm, the spectral transmittance is about 0.8 at 430 nm, the spectral transmittance is about 0.6 at 425 nm, and the spectral transmittance is about 0.2 at 415 nm.

Further, the spectral transmittance is 1.0 at 605 nm, the spectral transmittance is about 0.8 at 625 nm, the spectral transmittance is about 0.6 at 635 nm, and the spectral transmittance is about 0.2 at 660 nm.

Next, description will be given of the spectral characteristics of the pixels S1, S2, S3, and S4 in the case where, when arranging the infrared-cur filter 31 of the spectral characteristic shown in FIG. 7, and the four kinds of pixel of the spectral characteristics shown in FIG. 5 while taking into account the systems in the sensor section 11 that affect the spectral characteristics shown in FIG. 4, the sensitivity characteristic T(λ) is optimized using seven kinds of pigment.

While an arbitrary coordinate system may be selected for the final target color matching functions, as an example, description will be given of a case where color matching functions in the sRGB calorimetric system is to be realized.

Figure 8:
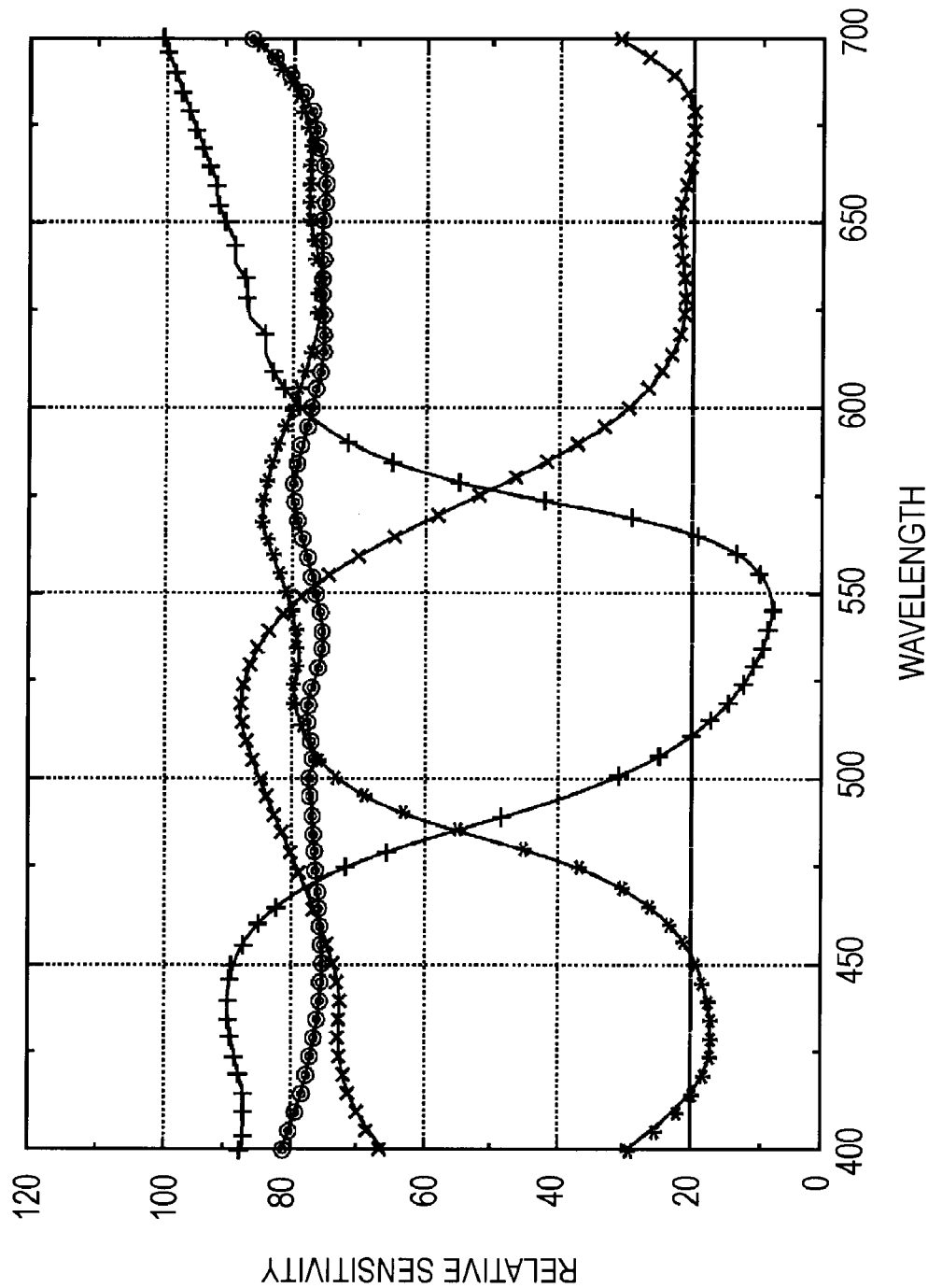
FIG. 8 is a diagram showing the spectral characteristics of pixels S1, S2, S3, and S4.

FIG. 8 is a diagram showing the spectral characteristics of the pixels S1, S2, S3, and S4 in the case where color matching functions in the sRGB calorimetric system is to be finally realized.

In FIG. 8, the spectral characteristic is represented by relative sensitivity. The plus mark (+) represents the relative sensitivity of the pixel S1, the cross mark (x) represents the relative sensitivity of the pixel S2, the asterisk (*) represents the relative sensitivity of the pixel S3, and the double circle (⊙) represents the relative sensitivity of the pixel S4.

The relative sensitivity of the pixel S4 is substantially constant at about 80 irrespective of the wavelength.

The relative sensitivity of the pixel S1 is substantially constant at about 90 within the wavelength range of 400 nm to 450 nm, lowers from about 90 to a little under 10 within the wavelength range of 450 nm to 540 nm, rises from a little under 10 to about 80 within the wavelength range of 540 nm to 600 nm, and further rises from about 80 to 100 within the wavelength range of 600 nm to 700 nm.

The relative sensitivity of the pixel S2 rises from about 70 to a little under 90 within the wavelength range of 400 nm to 520 nm, lowers from a little under 90 to about 20 within the wavelength range of 520 nm to 620 nm, is constant at about 20 within the wavelength range of 620 nm to 680 nm, and rises from about 20 to about 30 within the wavelength range of 680 nm to 700 nm.

The relative sensitivity of the pixel S3 lowers from about 30 to a little under 20 within the wavelength range of 400 nm to 430 nm, rises from a little under 20 to about 80 within the wavelength range of 430 nm to 520 nm, and further, is constant at about 80 within the wavelength range of 520 nm to 700 nm.

Figure 9:
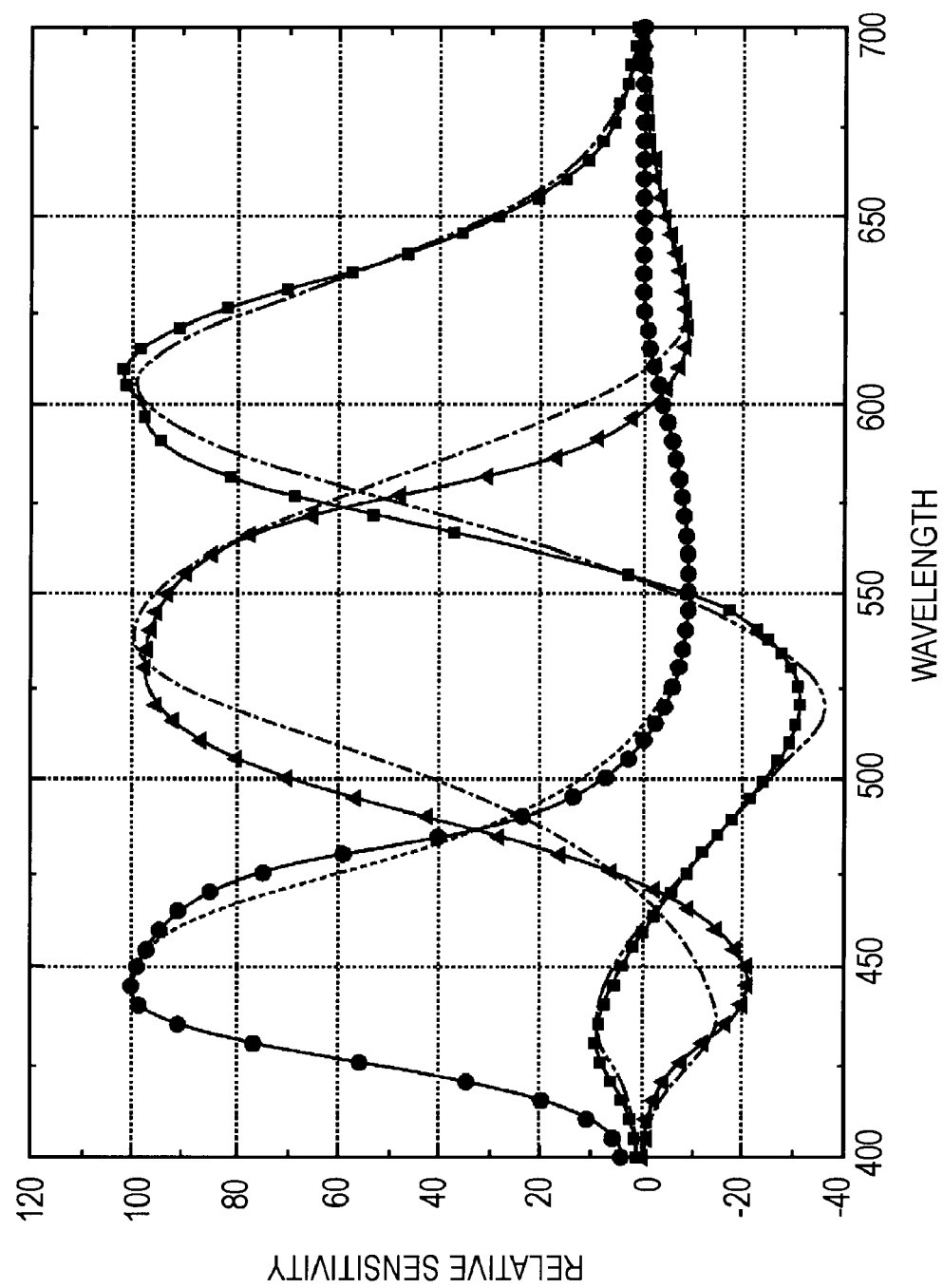
FIG. 9 is a diagram showing the respective spectral characteristics of RGB, as realized by the infrared-cut filter of the spectral characteristic shown in FIG. 7, and the spectral characteristics of the pixels S1, S2, S3, and S4 shown in FIG. 8.

FIG. 9 is a diagram showing the respective spectral characteristics of RGB, as realized by the infrared-cut filter 31 of the spectral characteristic shown in FIG. 7, and the spectral characteristics of the pixels S1, S2, S3, and S4 shown in FIG. 8.

In FIG. 9, the spectral characteristic is represented by relative sensitivity. The black circle represents the relative sensitivity of B, the black triangle represents the relative sensitivity of G, and the black square represents the relative sensitivity of R. Further, in FIG. 9, the dotted line represents the color matching function of B, the one-dot chain line represents the color matching function of G, and the two-dot chain line represents the color matching function of R.

As shown in FIG. 9, spectral characteristics that are more approximate to the color matching functions of the sRGB calorimetric system are obtained.

That is, a comparison between the spectral characteristics of RGB shown in FIG. 9 and the spectral characteristics of RGB according to the related art shown in FIG. 2 will reveal that the spectral characteristic of each of RGB shown in FIG. 9 involves a smaller difference, that is, a smaller error, in relation to the color matching function.

Further, in the spectral characteristics of RGB shown in FIG. 9, negative sensitivity, which cannot be realized with an ordinary color filter, is realized.

Next, the signal processing section 13 will be described in more detail.

FIG. 10 is a block diagram showing an example of the configuration of the signal processing section 13. The signal processing section 13 includes a white balance adjusting section 71, a generated-pixel-phase determining section 72, an RGB extracting section 73, and a weighted-averaging section 74.

The white balance adjusting section 71 adjusts the while balance of the outputs of the pixels of the sensor section 11. That is, the white balance adjusting section 71 adjusts the white balance of the outputs of the pixels S1, S2, S3, and S4. The white balance adjusting section 71 supplies the white-balance-adjusted pixel outputs to the generated-pixel-phase determining section 72 and the RGB extracting section 73.

The generated-pixel-phase determining section 72 determines, with respect to all of the pixels to be generated, the phase of the pixel to be generated. That is, the generated-pixel-phase determining section 72 determines the position of the pixel of the color image whose pixel value is to be calculated, from among positions shifted to the upper left, lower left, upper right, and lower left with respect to the position of the pixel S4 by half the distance of two pixels in the sensor section 11.

The phase of the pixel to be generated means at which one of the positions shifted to the upper left, lower left, upper right, or lower right with respect to the position of the pixel S4 by half the distance of two pixels in the sensor section 11, the pixel of the color image whose pixel value is to be calculated is located.

Figure 11:
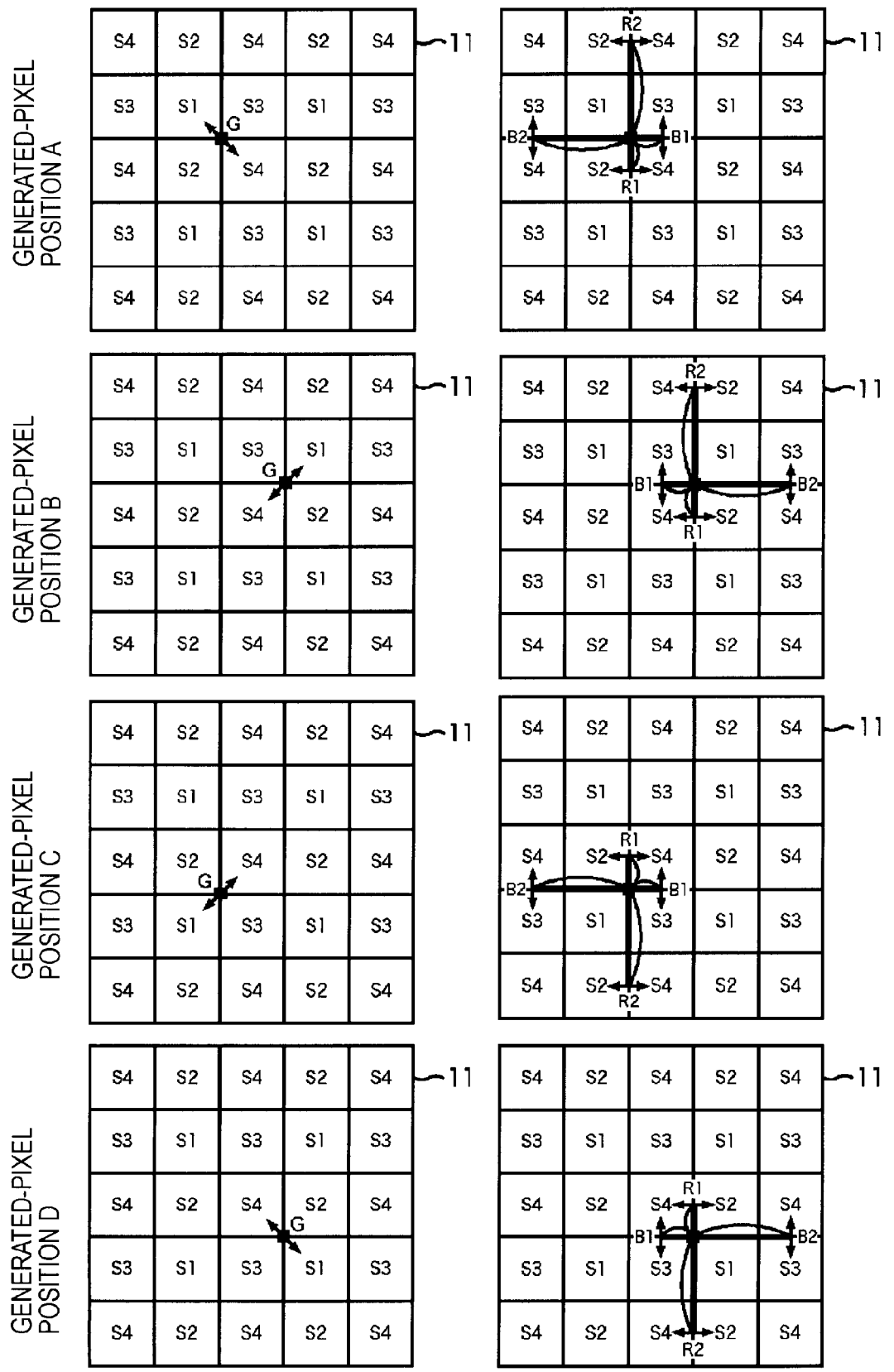
FIG. 11 is a diagram illustrating the phase of a pixel and weighted-averaging computation.

FIG. 11 is a diagram illustrating the phase of the pixel to be generated and weighted-averaging computation. The phase of the pixel corresponding to the generated-pixel position A is shown in the top diagram in FIG. 11. In the phase of the pixel corresponding to the generated-pixel position A, the position of the pixel of the color image whose pixel value is to be calculated is shifted to the upper left with respect to the position of the pixel S4, by half the distance of two pixels in the sensor section 11.

The phase of the pixel corresponding to the generated-pixel position B is shown in the second diagram from the top in FIG. 11. In the phase of the pixel corresponding to the generated-pixel position B, the position of the pixel of the color image whose pixel value is to be calculated is shifted to the upper right with respect to the position of the pixel S4, by half the distance of two pixels in the sensor section 11.

The phase of the pixel corresponding to the generated-pixel position C is shown in the third diagram from the top in FIG. 11. In the phase of the pixel corresponding to the generated-pixel position C, the position of the pixel of the color image whose pixel value is to be calculated is shifted to the lower left with respect to the position of the pixel S4, by half the distance of two pixels in the sensor section 11.

The phase of the pixel corresponding to the generated-pixel position D is shown in the fourth diagram from the top in FIG. 11. In the phase of the pixel corresponding to the generated-pixel position D, the position of the pixel of the color image whose pixel value is to be calculated is shifted to the lower right with respect to the position of the pixel S4, by half the distance of two pixels in the sensor section In other words, the generated-pixel-phase determining section 72 determines whether the phase of the pixel to be generated corresponds to the generated-pixel position A, the generated-pixel position B, the generated-pixel position C, and the generated-pixel position D.

The generated-pixel-phase determining section 72 supplies the determination result to the RGB extracting section 73 and the weighted-averaging section 74.

The RGB extracting section 73 calculates the respective values of RGB by Expression (3) from the white-balance-adjusted pixel outputs supplied from the white balance adjusting section 71. That is, the RGB extracting section 73 calculates R, G, B by calculating R=S4−S2, G=S4−S1, B=S4−S3. In other words, for each individual pixel S4, the RGB extracting section 73 calculates, with respect to the pixel S4 and the pixels S1, S2, and S3 adjacent to the pixel S4, the difference between the output of the pixel S4 and the output of the pixel S1, the difference between the output of the pixel S4 and the output of the pixel S2, and the difference between the output of the pixel S4 and the output of the pixel S3.

The RGB extracting section 73 supplies the respective values of RGB to the weighted-averaging section 74.

In accordance with the result of determination by the generated-pixel-phase determining section 72, the weighted-averaging section 74 calculates the pixel value of a pixel of a color image by taking the weighted average of the difference calculated from the output of the pixel S4 shifted with respect to the position of the pixel of the color image by half the distance of the pixel of the sensor section 11, and the difference calculated from the output of another pixel S4 belonging to another unit adjacent to the unit to which the above-mentioned pixel S4 belongs. In this case, the above-mentioned unit is made up of the pixels S1, S2, S3, and S4 that are arranged vertically and horizontally so as to be adjacent to each other. As shown in FIG. 11, this unit is arranged vertically or horizontally in the sensor section 11.

For example, the weighted-averaging section 74 calculates the final values of R and G by calculating R=(3*R1+R2)/4, B=(3*B1+B2)/4.

More specifically, for example, in the case where the phase of the pixel of the color image whose pixel value is to be calculated corresponds to the generated-pixel position A, as shown in the top diagram in FIG. 11, that pixel is positioned to the upper left of the pixel S4. Accordingly, R1 is calculated by subtracting, from the pixel value of the pixel S4 to the upper left of which the pixel whose pixel value is to be calculated is positioned, the pixel value of the pixel S2 located adjacent to the left of that pixel S4. Further, R2 is calculated by subtracting, from the pixel value of the pixel S4 located two pixels above the above-mentioned pixel S4, the pixel value of the pixel S2 located adjacent to the left of the pixel S4 that is located two pixels above. The final value of R is calculated by calculating R=(3*R1+R2)/4.

Further, B1 is calculated by subtracting, from the pixel value of the pixel S4 to the upper left of which the pixel whose pixel value is to be calculated is located, the pixel value of the pixel S3 above that pixel S4. Further, B2 is calculated by subtracting, from the pixel value of the pixel S4 located two pixels to the left of that pixel S4, the pixel value of the pixel S3 above the pixel S4 that is located two pixels to the left. The final value of B is calculated by calculating B=(3*B1+B2)/4.

It should be noted that in the case where the phase of the pixel of the color image whose pixel value is to be calculated corresponds to the generated-pixel position A, G is calculated by subtracting, from the pixel value of the pixel S4 to the upper left of which the pixel whose pixel value is to be calculated is located, the pixel value of the pixel S1 located to the upper left of that pixel S4.

For example, in the case where the phase of the pixel of the color image whose pixel value is to be calculated corresponds to the generated-pixel position B, as shown in the second diagram from the top in FIG. 11, that pixel is positioned to the upper right of the pixel S4. Accordingly, R1 is calculated by subtracting, from the pixel value of the pixel S4 to the upper right of which the pixel whose pixel value is to be calculated is positioned, the pixel value of the pixel S2 located adjacent to the right of that pixel S4. Further, R2 is calculated by subtracting, from the pixel value of the pixel S4 located two pixels above the above-mentioned pixel S4, the pixel value of the pixel S2 located adjacent to the right of the pixel S4 that is located two pixels above. The final value of R is calculated by calculating R=(3*R1+R2)/4.

Further, B1 is calculated by subtracting, from the pixel value of the pixel S4 to the upper right of which the pixel whose pixel value is to be calculated is located, the pixel value of the pixel S3 above that pixel S4. Further, B2 is calculated by subtracting, from the pixel value of the pixel S4 located two pixels to the right of that pixel S4, the pixel value of the pixel S3 above the pixel S4 that is located two pixels to the right. The final value of B is calculated by calculating B=(3*B1+B2)/4.

It should be noted that in the case where the phase of the pixel of the color image whose pixel value is to be calculated corresponds to the generated-pixel position B, G is calculated by subtracting, from the pixel value of the pixel S4 to the upper right of which the pixel whose pixel value is to be calculated is located, the pixel value of the pixel S1 located to the upper right of that pixel S4.

For example, in the case where the phase of the pixel of the color image whose pixel value is to be calculated corresponds to the generated-pixel position C, as shown in the third diagram from the top in FIG. 11, that pixel is positioned to the lower left of the pixel S4. Accordingly, R1 is calculated by subtracting, from the pixel value of the pixel S4 to the lower left of which the pixel whose pixel value is to be calculated is positioned, the pixel value of the pixel S2 located adjacent to the left of that pixel S4. Further, R2 is calculated by subtracting, from the pixel value of the pixel S4 located two pixels below the above-mentioned pixel S4, the pixel value of the pixel S2 located adjacent to the left of the pixel S4 that is located two pixels below. The final value of R is calculated by calculating R=(3*R1+R2)/4.

Further, B1 is calculated by subtracting, from the pixel value of the pixel S4 to the lower left of which the pixel whose pixel value is to be calculated is located, the pixel value of the pixel S3 below that pixel S4. Further, B2 is calculated by subtracting, from the pixel value of the pixel S4 located two pixels to the left of that pixel S4, the pixel value of the pixel S3 below the pixel S4 that is located two pixels to the left. The final value of B is calculated by calculating B=(3*B1+B2)/4.

It should be noted that in the case where the phase of the pixel of the color image whose pixel value is to be calculated corresponds to the generated-pixel position C, G is calculated by subtracting, from the pixel value of the pixel S4 to the lower left of which the pixel whose pixel value is to be calculated is located, the pixel value of the pixel S1 located to the lower left of that pixel S4.

For example, in the case where the phase of the pixel of the color image whose pixel value is to be calculated corresponds to the generated-pixel position D, as shown in the bottom diagram in FIG. 11, that pixel is positioned to the lower right of the pixel S4. Accordingly, R1 is calculated by subtracting, from the pixel value of the pixel S4 to the lower right of which the pixel whose pixel value is to be calculated is positioned, the pixel value of the pixel S2 located adjacent to the right of that pixel S4. Further, R2 is calculated by subtracting, from the pixel value of the pixel S4 located two pixels below the above-mentioned pixel S4, the pixel value of the pixel S2 located adjacent to the right of the pixel S4 that is located two pixels below. The final value of R is calculated by calculating R=(3*R1+R2)/4.

Further, B1 is calculated by subtracting, from the pixel value of the pixel S4 to the lower right of which the pixel whose pixel value is to be calculated is located, the pixel value of the pixel S3 below that pixel S4. Further, B2 is calculated by subtracting, from the pixel value of the pixel S4 located two pixels to the right of that pixel S4, the pixel value of the pixel S3 below the pixel S4 that is located two pixels to the right. The final value of B is calculated by calculating B=(3*B1+B2)/4.

It should be noted that in the case where the phase of the pixel of the color image whose pixel value is to be calculated corresponds to the generated-pixel position D, G is calculated by subtracting, from the pixel value of the pixel S4 to the lower right of which the pixel whose pixel value is to be calculated is located, the pixel value of the pixel S1 located to the lower right of that pixel S4.

FIG. 12 is a flow chart illustrating an example of signal processing by the signal processing section 13. In step S11, the white balance adjusting section 71 adjusts the white balance of the outputs of the pixels S1, S2, S3, and S4 of the sensor section 11.

In step S12, the generated-pixel-phase determining section 72 selects the pixel to be generated. More precisely, in step S12, the generated-pixel-phase determining section 72 determines the position of the pixel to be generated.

In step S13, the generated-pixel-phase determining section 72 determines to which one of the generated-pixel position A, generated-pixel position B, generated-pixel position C, and generated-pixel position D the position of the pixel to be generated corresponds.

In step S14, the RGB extracting section 73 extracts RGB of surrounding pixels. For example, in step S14, the RGB extracting section 73 calculates RGB from the pixels S1, S2, S3, and S4 in the surrounding of the pixel to be generated. More specifically, for example, in step S14, the RGB extracting section 73 calculates RGB by Expression (3) from the pixel S4 adjoining the pixel to be generated, the pixel S4 located two pixels above that pixel S4, the pixel S4 located two pixels below that pixel S4, the pixel S4 located two pixels to the right of that pixel S4, the pixel S4 located two pixels to the left of that pixel S4, and the pixels S1, S2, and S3 that are adjacent to each of those pixels S4.

In step S15, the weighted-averaging section 74 performs weighted-averaging with respect to R and B to thereby calculate the final R and B. That is, as described above with reference to FIG. 11, in step S15, in accordance with the determination result of the phase of the pixel to be generated, the weighted-averaging section 74 calculates the pixel value of a pixel of a color image by taking the weighted average between the difference calculated from the output of the pixel S4 shifted with respect to the position of the pixel of the color image by half the distance of the pixel of the sensor section 11, and the difference calculated from the output of another pixel S4 belonging to another unit adjacent to the unit to which the above-mentioned pixel S4 belongs.

In step S16, the generated-pixel-phase determining section 72 determines whether or not processing of the entire screen has been finished, and if it is determined that processing of the entire screen has not been finished, the process returns to step S12, and the above-described processing is repeated with respect to the next pixel to be generated.

If it is determined in step S16 that processing of the entire screen has been finished, the RGB signal obtained by signal processing is outputted, and the processing ends.

In this way, it is possible to reduce variations in the color of an image due to variations between the respective pixels of the sensor section 11, and further, it is possible to reduce variations in the color of an image resulting from the relative positional relation between a pixel of the sensor section 11 and an optical image formed in the pixel of the sensor section 11.

Further, the white balance of the signal of a color image may be adjusted as well.

Figure 13:
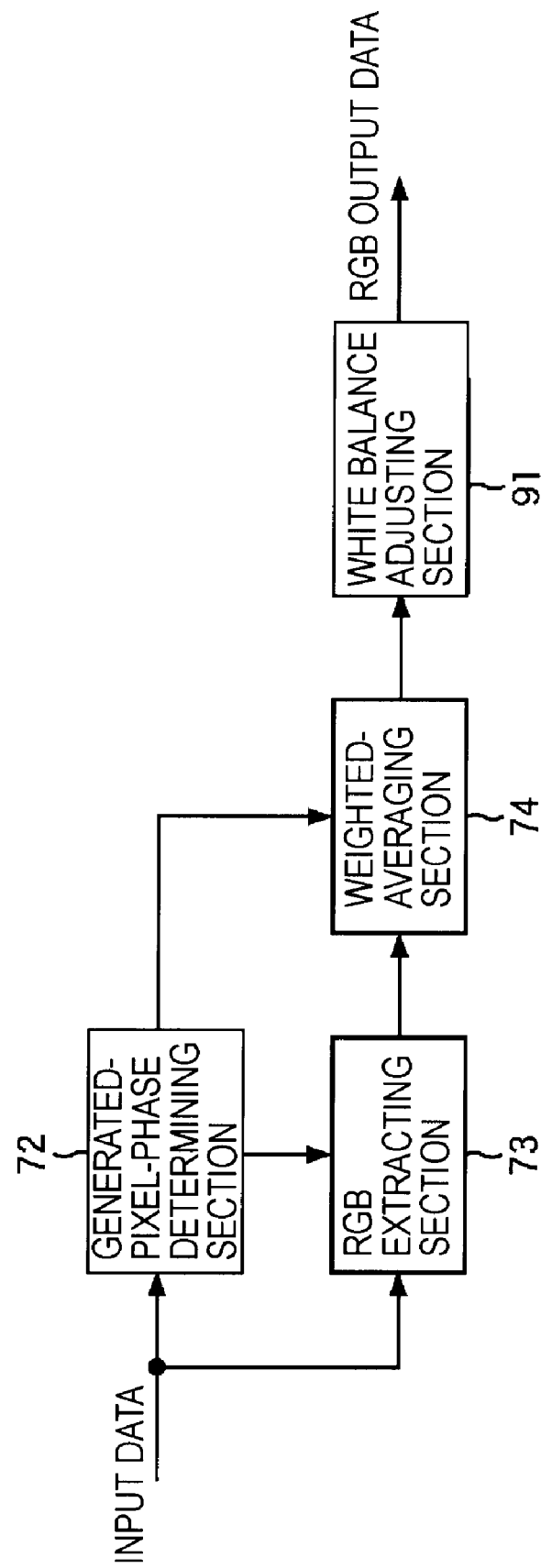
FIG. 13 is a block diagram showing another example of the configuration of the signal processing section.

FIG. 13 is a block diagram showing another example of the configuration of the signal processing section 13. In FIG. 13, the portions that are identical to those shown in FIG. 10 are denoted by the same reference numerals, and description thereof is omitted.

The signal processing section 13 shown in FIG. 13 includes the generated-pixel-phase determining section 72, the RGB extracting section 73, the weighted-averaging section 74, and a white balance adjusting section 91.

The white balance adjusting section 91 adjusts the white balance of the signal of a color image obtained by signal processing. That is, the white balance adjusting section 91 adjusts the white balance of the RGB signal that has undergone signal processing in the generated-pixel-phase determining section 72, the RGB extracting section 73, and the weighted-averaging section 74 and has been outputted from the weighted-averaging section 74.

Figure 14:
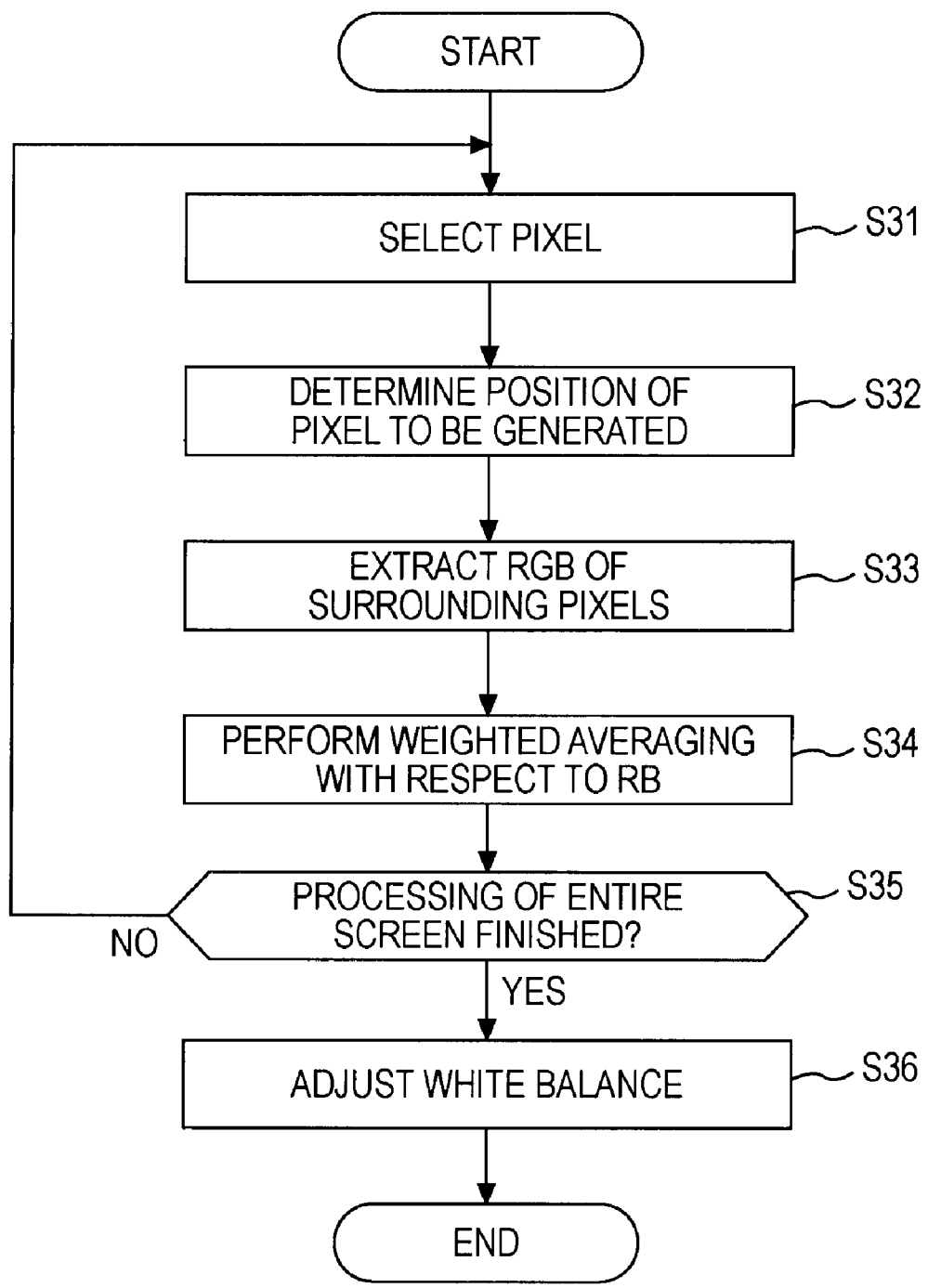
FIG. 14 is a flow chart illustrating another example of signal processing by the signal processing section.

FIG. 14 is a flow chart showing another example of the signal processing by the signal processing section 13. Since steps S31 to S35 are the same as steps S12 to S16 in FIG. 12, description thereof is omitted.

In step S36, the white balance adjusting section 91 adjusts the white balance of the RGB signal obtained by the signal processing in steps S32 to S35, and outputs the white-balance-adjusted RGB signal. The processing then ends.

In this way, the white balance can be adjusted either before or after the signal processing.

It should be noted that not only color matching functions in the sRGB calorimetric system, but also color matching functions in the XYZ system can be realized.

Figure 15:
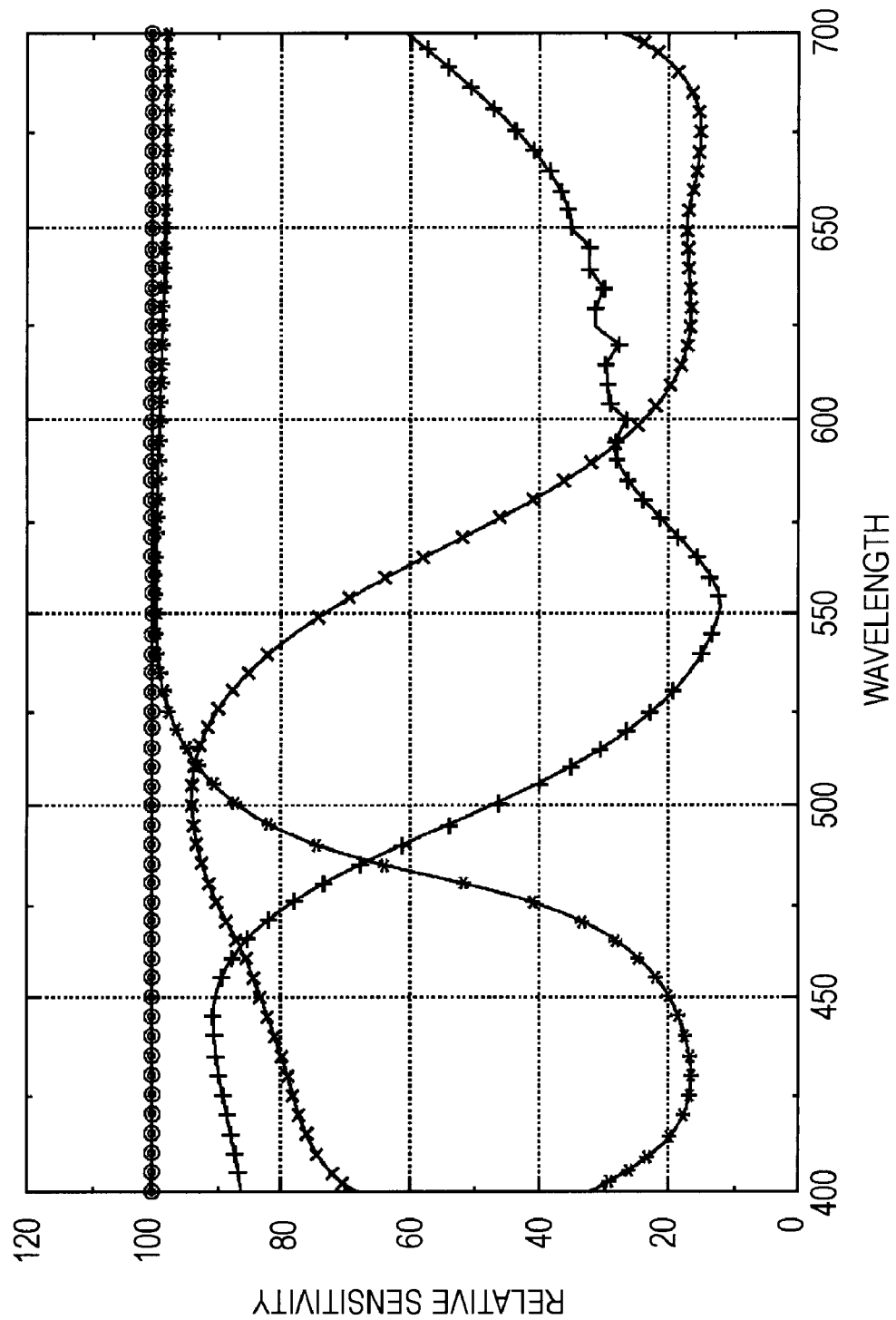
FIG. 15 is a diagram showing the spectral characteristics of the pixels S1, S2, S3, and S4.

FIG. 15 is a diagram showing the spectral characteristics of the pixels S1, S2, S3, and S4 in the case where color matching functions in the XYZ system are to be finally realized.

In FIG. 15, the spectral characteristic is represented by relative sensitivity. The plus mark (+) represents the relative sensitivity of the pixel S1, the cross mark (x) represents the relative sensitivity of the pixel S2, the asterisk (*) represents the relative sensitivity of the pixel S3, and the double circle (◎) represents the relative sensitivity of the pixel S4.

The relative sensitivity of the pixel S4 is substantially constant at about 100 irrespective of the wavelength.

The relative sensitivity of the pixel S1 is substantially constant at about 90 within the wavelength range of 400 nm to 450 nm, lowers from about 90 to about 10 within the wavelength range of 450 nm to 550 nm, rises from about 10 to about 30 within the wavelength range of 550 nm to 600 nm, is constant at about 30 within the wavelength range of 600 nm to 640 nm, and further rises from about 30 to 60 within the wavelength range of 640 nm to 700 nm.

The relative sensitivity of the pixel S2 rises from about 70 to a little over 90 within the wavelength range of 400 nm to 500 nm, lowers from a little over 90 to a little under 20 within the wavelength range of 500 nm to 620 nm, is constant at about a little under 20 within the wavelength range of 620 nm to 680 nm, and rises from a little under 20 to a little under 30 within the wavelength range of 680 nm to 700 nm.

The relative sensitivity of the pixel S3 lowers from about 30 to a little under 20 within the wavelength range of 400 nm to 430 nm, rises from a little under 20 to about 100 within the wavelength range of 430 nm to 550 nm, and further, is constant at about 100 within the wavelength range of 550 nm to 700 nm.

Figure 16:
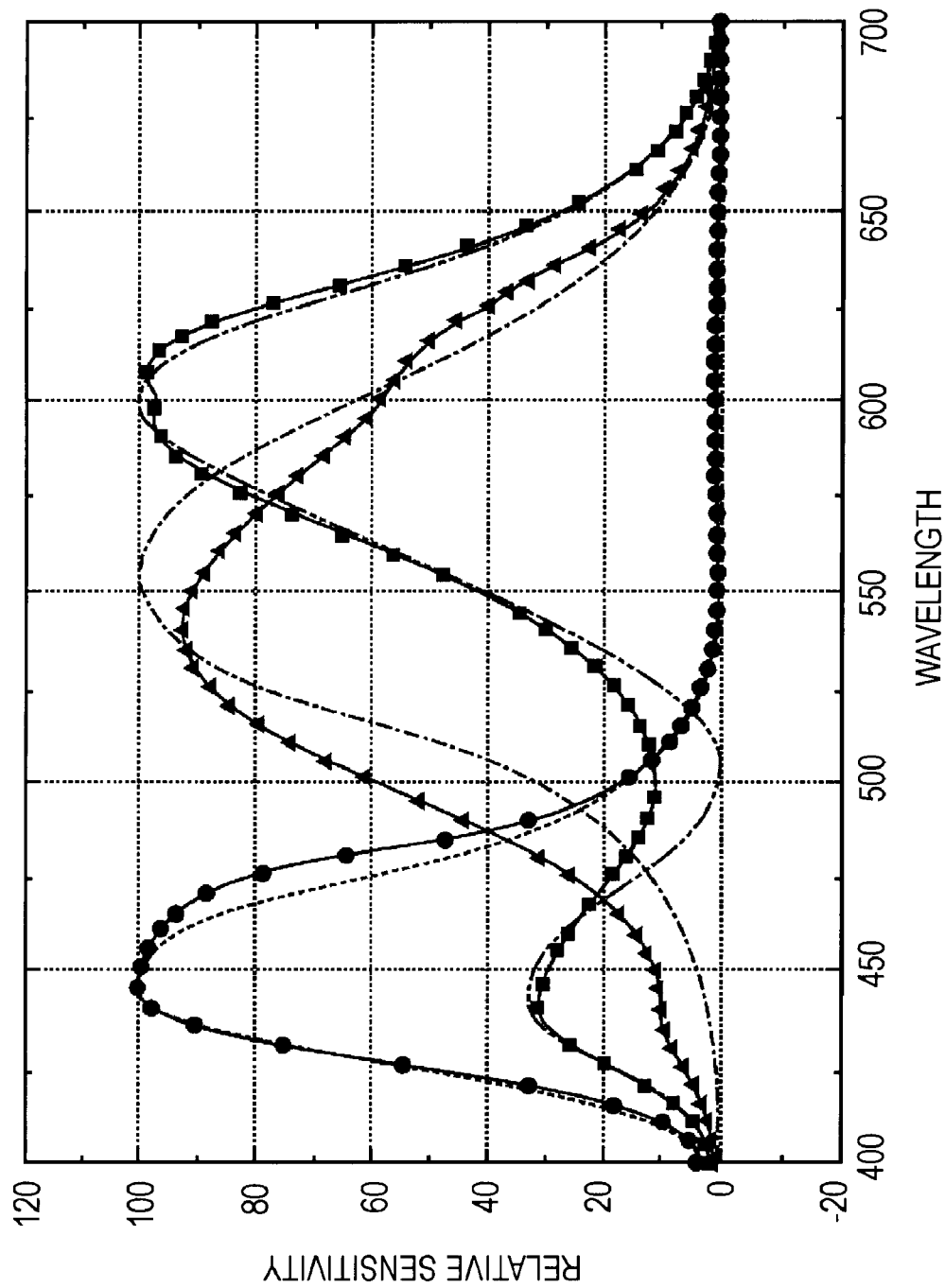
FIG. 16 is a diagram showing the respective spectral characteristics of XYZ, as realized by the infrared-cut filter of the spectral characteristic shown in FIG. 7, and the spectral characteristics of the pixels S1, S2, S3, and S4 shown in FIG. 15.

FIG. 16 is a diagram showing the respective spectral characteristics of XYZ, as realized by the infrared-cut filter 31 of the spectral characteristic shown in FIG. 7, and the spectral characteristics of the pixels S1, S2, S3, and S4 shown in FIG. 15.

In FIG. 16, the spectral characteristic is represented by relative sensitivity. The black circle represents the relative sensitivity of Z, the black triangle represents the relative sensitivity of Y, and the black square represents the relative sensitivity of X. Further, in FIG. 16, the dotted line represents the color matching function of Z, the one-dot chain line represents the color matching function of Y, and the two-dot chain line represents the color matching function of X.

As shown in FIG. 16, spectral characteristics that are more approximate to the color matching functions of the XYZ system are obtained.

Next, description will be given of signal processing in which, by correcting the deviation between the spectral characteristics obtained from the differences between the pixels of the sensor section 11, and the final target color matching functions, an RGB image photographed by a so-called single-chip image sensor is recreated as an RGB image equal to an RGB image photographed by a so-called three-chip image sensor.

For example, the signal processing section 13 applies to the output of the sensor section 11 signal processing that is class classification adaptive processing using coefficients for individual classes determined in advance.

Class classification adaptive processing includes classifying input signals into several classes on the basis of their features, and performing, with respect to input signals of each class, adaptive processing appropriate for that class. The class classification adaptive processing is roughly divided into class classification processing and adaptive processing.

Here, brief description will be given of the class classification processing and adaptive processing.

First, the class classification processing will be described.

As shown in FIG. 5, a block (class classification block) consisting of 2×2 pixels is formed by the pixel S4 closest to a given focus pixel, and three pixels S1, S2, and S3 adjacent to the pixel S4. Further, it is assumed that each pixel is represented as 1 bit (takes the level of either 0 or 1). In this case, the block of 2×2=4 pixels corresponding to the focus pixel can be classified into 16 (=$(2^1)^4$) patterns due to the level distribution of each pixel. Accordingly, in the present case, the focus pixel can be classified into 16 patterns.

In this case, normally about 8 bits are assigned to each pixel. If the block for class classification is formed by 12 pixels, the focus pixel is classified into an enormous number of classes as large as $(2^8)^{12}$.

By making the number of bits of the pixels constituting the block for class classification small, the number of classes is reduced.

Next, the adaptive processing will be described.

For example, now, a case is considered in which the predicted value E[y] of the pixel value y of an RGB image (hereinafter, referred to as a teacher image as appropriate, and the data thereof is referred to as teacher data) is found from a linear primary combination model defined by the linear combination of the outputs of the pixels of the sensor section 11 (hereinafter, as appropriate, the outputs of pixels of the sensor section 11 corresponding to one image are referred to as a student image, and the data thereof is referred to as learning data), $x_1, x_2, \ldots$, and predetermined prediction coefficients $w_1, w_2, \ldots$. In this case, the prediction value E[y] can be expressed by the following expression.

$$E[y] = w_1 x_1 + w_2 x_2 + \quad (4)$$

Now, in order to generalize the model, a matrix W consisting of a set of prediction coefficients w, a matrix X consisting of a set of learning data, a matrix Y' consisting of a set of prediction values E[y] are defined as follows:

$$X = \begin{bmatrix} x_{11} & x_{12} & \cdots & x_{1n} \\ x_{21} & x_{22} & \cdots & x_{2n} \\ \cdots & \cdots & \cdots & \cdots \\ x_{m1} & x_{m2} & \cdots & x_{mn} \end{bmatrix}$$

$$W = \begin{bmatrix} w_1 \\ w_2 \\ \cdots \\ w_n \end{bmatrix}, Y' = \begin{bmatrix} E[y_1] \\ E[y_2] \\ \cdots \\ E[y_m] \end{bmatrix}$$

Then, the following observation equation holds:

$$XW = Y' \quad (5)$$

Now, consider a case where a prediction value E[y] proximate to a pixel value y of the RGB image is found by applying a least square method to the observational equation. In this case, a matrix Y consisting of a set of pixel values y of the RGB image, and a matrix E consisting of residuals e of the prediction values E[y] with respect to the pixel values y of the RGB image are defined as follows:

$$E = \begin{bmatrix} e_1 \\ e_2 \\ \cdots \\ e_m \end{bmatrix}, Y' = \begin{bmatrix} y_1 \\ y_2 \\ \cdots \\ y_m \end{bmatrix}$$

Then, from Expression (5), the following residual equation holds:

$$XW = Y + E \quad (6)$$

In this case, a prediction coefficient $w_i$ for finding the prediction value E[y] proximate to the pixel value y of the original RGB image can be found by minimizing the square error expressed as follows:

$$\sum_{i=1}^{m} e_i^2$$

Therefore, if the value obtained by differentiating the above-described square error by the prediction coefficient $w_i$ is 0, it follows that a prediction coefficient $w_i$ that satisfies the following equation is the optimum value for determining a prediction value E[y] approximate to the pixel value y of the RGB image.

$$e_1 \frac{\partial e_1}{\partial w_i} + e_2 \frac{\partial e_2}{\partial w_i} + \cdots + e_m \frac{\partial e_m}{\partial w_i} = 0 \quad (7)$$

$$(i = 1, 2, \cdots, n)$$

Thus, first, by differentiating Expression (6) by the prediction coefficient $w_i$, the following equation is obtained.

$$\frac{\partial e_i}{\partial w_1} + x_{i1}, \frac{\partial e_i}{\partial w_2} = x_{i2}, \cdots, \frac{\partial e_i}{\partial w_n} = x_{in}, \quad (8)$$

$$(i = 1, 2, \cdots, n)$$

Expression (9) is obtained from Expressions (7) and (8).

$$\sum_{i=1}^{m} e_i x_{i1} = 0, \sum_{i=1}^{m} e_i x_{i2} = 0, \cdots \sum_{i=1}^{m} e_i x_{in} = 0 \quad (9)$$

In addition, by taking into consideration the relation between the learning data x, the prediction coefficient w, the teacher data y, and the residual e in the residual equation of Expression (6), the following normal equation can be obtained from Expression (9).

$$\begin{cases} \left(\sum_{i=1}^{m} x_{i1}x_{i1}\right)w_1 + \left(\sum_{i=1}^{m} x_{i1}x_{i2}\right)w_2 + \cdots + \left(\sum_{i=1}^{m} x_{i1}x_{in}\right)w_n = \left(\sum_{i=1}^{m} x_{i1}y_i\right) \\ \left(\sum_{i=1}^{m} x_{i2}x_{i1}\right)w_1 + \left(\sum_{i=1}^{m} x_{i2}x_{i2}\right)w_2 + \cdots + \left(\sum_{i=1}^{m} x_{i2}x_{in}\right)w_n = \left(\sum_{i=1}^{m} x_{i2}y_i\right) \\ \cdots \\ \left(\sum_{i=1}^{m} x_{in}x_{i1}\right)w_1 + \left(\sum_{i=1}^{m} x_{in}x_{i2}\right)w_2 + \cdots + \left(\sum_{i=1}^{m} x_{in}x_{in}\right)w_n = \left(\sum_{i=1}^{m} x_{in}y_i\right) \end{cases} \quad (10)$$

The normal equation of Expression (10) can be established for the same number as the number of prediction coefficients w to be found. Therefore, the optimum prediction coefficient w can be found by solving Expression (10). It should be noted that in solving Expression (10), for example, a sweep method (Gauss-Jordan elimination method) can be applied.

The adaptive processing refers to processing in which the optimum prediction coefficient w is found for each individual class in the above-mentioned manner, and further, by using the prediction coefficient w, the prediction value E[y] proximate to the pixel value y of the RGB image is found by Expression (4).

Figure 17:
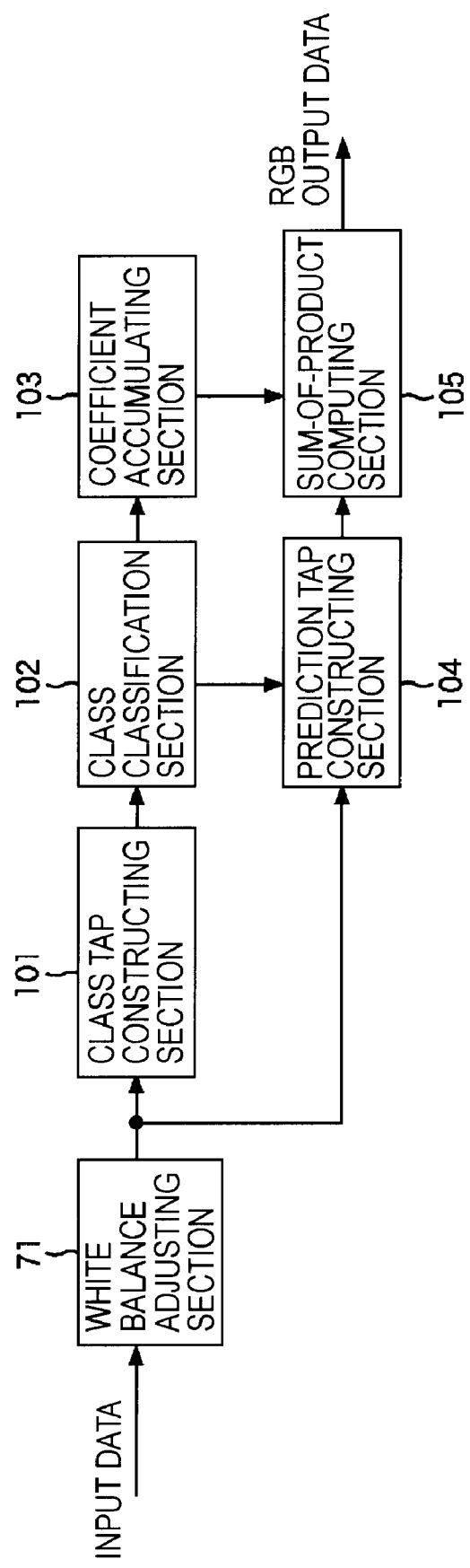
FIG. 17 is a block diagram showing still another example of the configuration of the signal processing section.

FIG. 17 is a block diagram showing another example of the configuration of the signal processing section 13, which applies to the output of the sensor section 11 signal processing that is class classification adaptive processing using coefficients for individual classes determined in advance. It should be noted that in FIG. 17, the portions that are identical to those shown in FIG. 10 are denoted by the same reference numerals, and description thereof is omitted.

The signal processing section 13 shown in FIG. 17 includes the white balance adjusting section 71, a class tap constructing section 101, a class classification section 102, a coefficient accumulating section 103, a prediction tap constructing section 104, and a sum-of-product computing section 105.

The white balance adjusting section 71 supplies the white-balance-adjusted outputs of the pixels of the sensor section 11 to the class tap constructing section 101 and the prediction tap constructing section 104.

The class tap constructing section 101 constructs a class tap. That is, in accordance with a pixel to be generated, which is a focus pixel, the class tap constructing section 101 extracts, from among the white-balance-adjusted outputs of the pixels of the sensor section 11 supplied from the white balance adjusting section 71, outputs of pixels as a class tap constituting the block for class classification.

Figure 18:
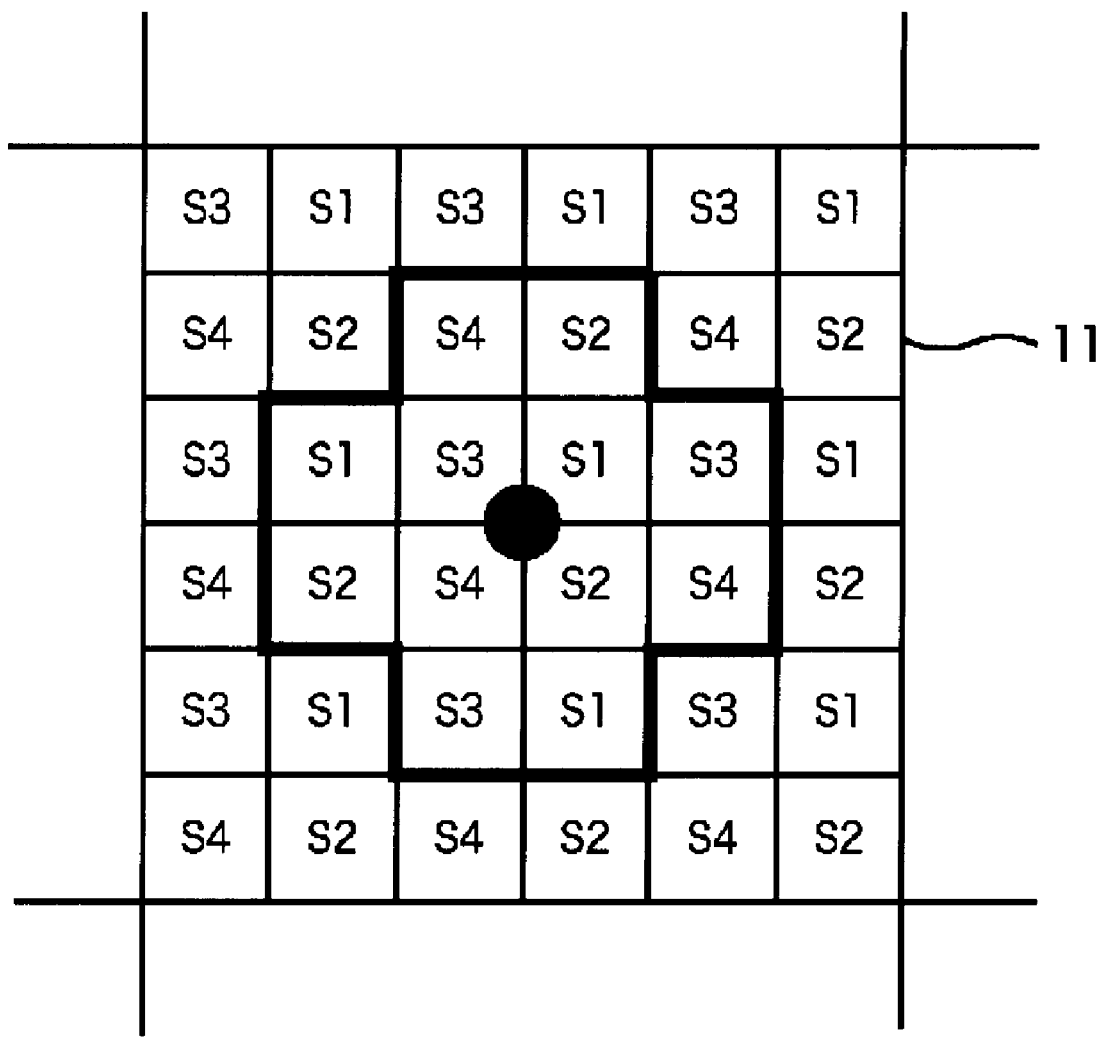
FIG. 18 is a diagram showing an example of the arrangement of a class tap.

FIG. 18 is a diagram showing an example of class tap arrangement. In FIG. 18, the black circle represents the pixel to be generated, which is a focus pixel. In the example shown in FIG. 18, with respect to the positions of the pixels S1 to S4 in the sensor section 11, the focus pixel is located at a position shifted by half the distance between the pixels S1 to S4 relative to each other.

For example, the class tap constructing section 101 constructs a class tap by extracting, as a class tap, the outputs of the pixels S1 to S4 belonging to the range of four pixels across and two pixels down with the focus pixel as the center, or belonging to the range of two pixels across and four pixels down with the focus pixel as the center.

The class tap constructing section 101 supplies a class tap to the class classification section 102.

The class classification section 102 subjects the focus pixel to class classification by the class tap. The class classification section 102 is configured so that ADRC processing is performed with respect to the class tap. Accordingly, by making the number of bits of the outputs of the pixels constituting the class tap small, the number of classes is reduced.

Figure 19:
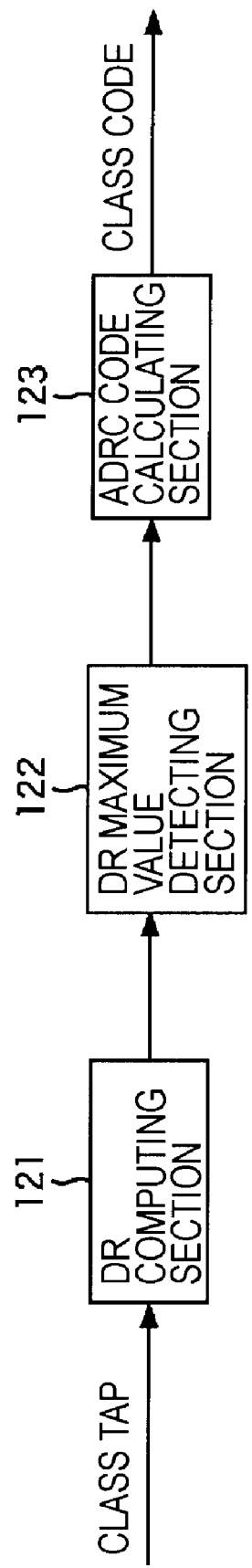
FIG. 19 is a block diagram showing an example of the configuration of a class classification section.

FIG. 19 is a block diagram showing an example of the configuration of the class classification section 102. The class classification section 102 includes a DR computing section 121, a DR maximum value detecting section 122, and an ADRC code calculating section 123.

The DR computing section 121 computes dynamic range DR=maximum value MAX−minimum value MIN with respect to each of the respective outputs of the pixels S1, S2, S3, and S4 constituting a class tap. That is, the DR computing section 121 detects the maximum value MAX and the minimum value MIN from among the outputs of three pixels S1 constituting the class tap, and subtracts the minimum value MIN from the detected maximum value MAX to thereby calculate the dynamic range DR with respect to the output of the pixel S1. Likewise, the DR computing section 121 detects the maximum value MAX and the minimum value MIN from among the outputs of three pixels S2 constituting the class tap, and subtracts the minimum value MIN from the detected maximum value MAX to thereby calculate the dynamic range DR with respect to the output of the pixel S2.

Further, the DR computing section 121 detects the maximum value MAX and the minimum value MIN from among the outputs of three pixels S3 constituting the class tap, and subtracts the minimum value MIN from the detected maximum value MAX to thereby calculate the dynamic range DR with respect to the output of the pixel S3. Furthermore, the DR computing section 121 detects the maximum value MAX and the minimum value MIN from among the outputs of three pixels S4 constituting the class tap, and subtracts the minimum value MIN from the detected maximum value MAX to thereby calculate the dynamic range DR with respect to the output of the pixel S4.

The DR computing section 121 supplies the respective dynamic ranges DR to the DR maximum value detecting section 122.

The DR maximum value detecting section 122 detects the maximum value from among the dynamic range DR with respect to the output of the pixel S1, the dynamic range DR with respect to the output of the pixel S2, the dynamic range DR with respect to the output of the pixel S3, and the dynamic range DR with respect to the output of the pixel S4. The DR maximum value detecting section 122 supplies the maximum dynamic range DR to the ADRC code calculating section 123.

The ADRC code calculating section 123 re-quantizes the outputs of the pixels S1, S2, S3, and S4 constituting the class tap into K bits on the basis of the maximum dynamic range DR, and calculates the ADRC code.

That is, the ADRC code calculating section 123 subtracts the minimum value MIN used in the computation of the maximum dynamic range DR, from each of the outputs of the pixels S1, S2, S3, and S4 constituting the class tap, and divides the subtraction value by $DR/2^K$, followed by conversion into a code (ADRC code) corresponding to the division value obtained as a result. Specifically, assuming that, for example, K=2, it is determined whether or not the division value belongs to either one of the ranges obtained by dividing the dynamic range into $4(=2^2)$ equal parts. In the case where the division value belongs to the range of the lowest level, the range of the second lowest level, the range of the third lowest range, or the range of the highest level, the division value is coded into 2 bits such as 00B, 01B, 10B, or 11B, respectively (B represents a binary number).

By performing ADRC processing in which re-quantization is carried out with the number of bits smaller than the number of bits assigned to the outputs of pixels constituting a class tap, as described above, the number of classes can be reduced. Such ADRC processing is performed in the class classification section 102.

The ADRC code calculating section 123 outputs the ADRC code thus obtained as a class codes. For example, the ADRC code calculating section 123 outputs a class code obtained by sequentially arraying ADRC codes calculated from the outputs of the pixels S1, S2, S3, and S4 constituting a class tap.

In the case where, on the basis of a class tap constituted by the outputs of twelve pixels S1, S2, S3, and S4 shown in FIG. 18, ADRC codes of 1 bit are respectively calculated from the outputs of the pixels S1, S2, S3, and S4 constituting the class tap, the ADRC calculating section 123 outputs a class code that classifies a focus pixel into $2^{12}=4096$ classes.

As described above, even in the case where the waveform of a color signal changes in the surrounding of a focus pixel, a class code is calculated by corresponding computation, so the focus pixel is classified into classes corresponding to the RGB of Expression (3).

It should be noted that although the arrangement of a class tap changes in accordance with the phase, by inverting the class tap horizontally, or by inverting the class tap vertically, the class tap can be handled in the same manner as the class tap shown in FIG. 18.

The ADRC code calculating section 123 supplies the class code obtained as a result of the class classification of a focus pixel to the coefficient accumulating section 103 and the prediction tap constructing section 104.

The coefficient accumulating section 103 accumulates prediction coefficients w for individual classes in advance. Upon supply of a class code from the class classification section 102, the coefficient accumulating section 103 supplies to the sum-of-product computing section 105 the prediction coefficients w of the classes indicated by the class code.

The prediction tap constructing section 104 constructs a prediction tap. That is, in accordance with the pixel to be generated, which is a focus pixel, the prediction tap constructing section 104 extracts, from among the white-balance-adjusted outputs of the pixels of the sensor section 11 supplied from the white balance adjusting section 71, a prediction tap as the outputs of the pixels of the sensor section 11 used for the sum-of-product computation of Expression (4). For example, the prediction tap constructing section 104 constructs a prediction tap in accordance with the class indicated by the class code supplied from the class classification section 102.

Figure 20:
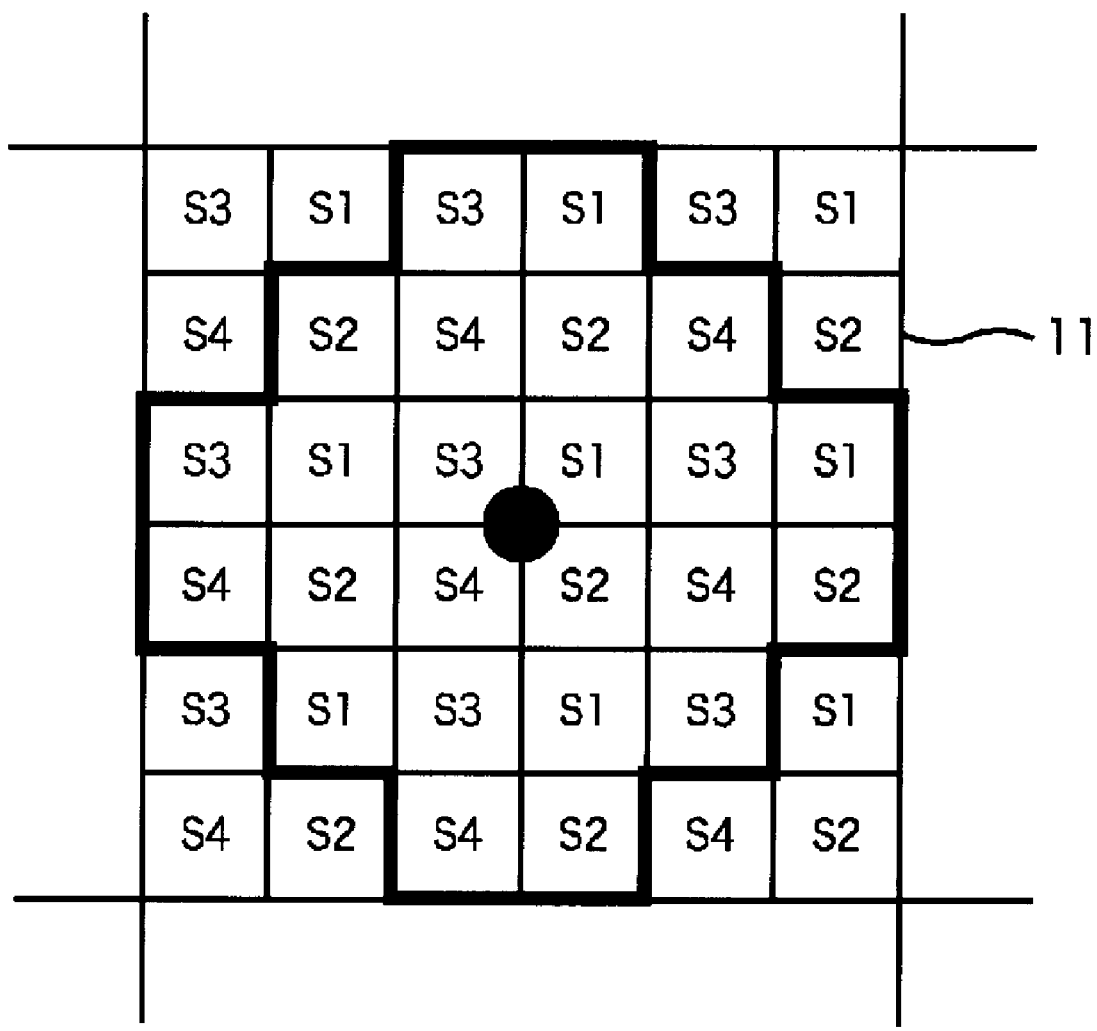
FIG. 20 is a diagram showing an example of the arrangement of a prediction tap.

FIG. 20 is a diagram showing an example of the arrangement of a prediction tap. In FIG. 20, the black circle represents the pixel to be generated, which is a focus pixel.

For example, the prediction tap constructing section 104 constructs a prediction tap by extracting, as a prediction tap, the outputs of the pixels S1 to S4 belonging to the range of six pixels across and two pixels down with the focus pixel as the center, or belonging to the range of two pixels across and six pixels down with the focus pixel as the center. In this case, 24 prediction taps each formed by the outputs of the pixels S1 to S4 are constructed.

It should be noted that although the arrangement of a prediction tap changes in accordance with the phase, by inverting the prediction tap horizontally, or by inverting the prediction tap vertically, the prediction tap can be handled in the same manner as the prediction tap shown in FIG. 20.

The prediction tap constructing section 104 supplies the prediction taps to the sum-of-product computing section 105.

The sum-of-product computing section 105 applies the sum-of-product computation of Expression (4) with respect to the prediction taps supplied from the prediction tap constructing section 104 and the prediction coefficients w supplied from the coefficient accumulating section 103, thereby predicting the pixel value of the focus pixel as the pixel value of an RGB image.

Figure 21:
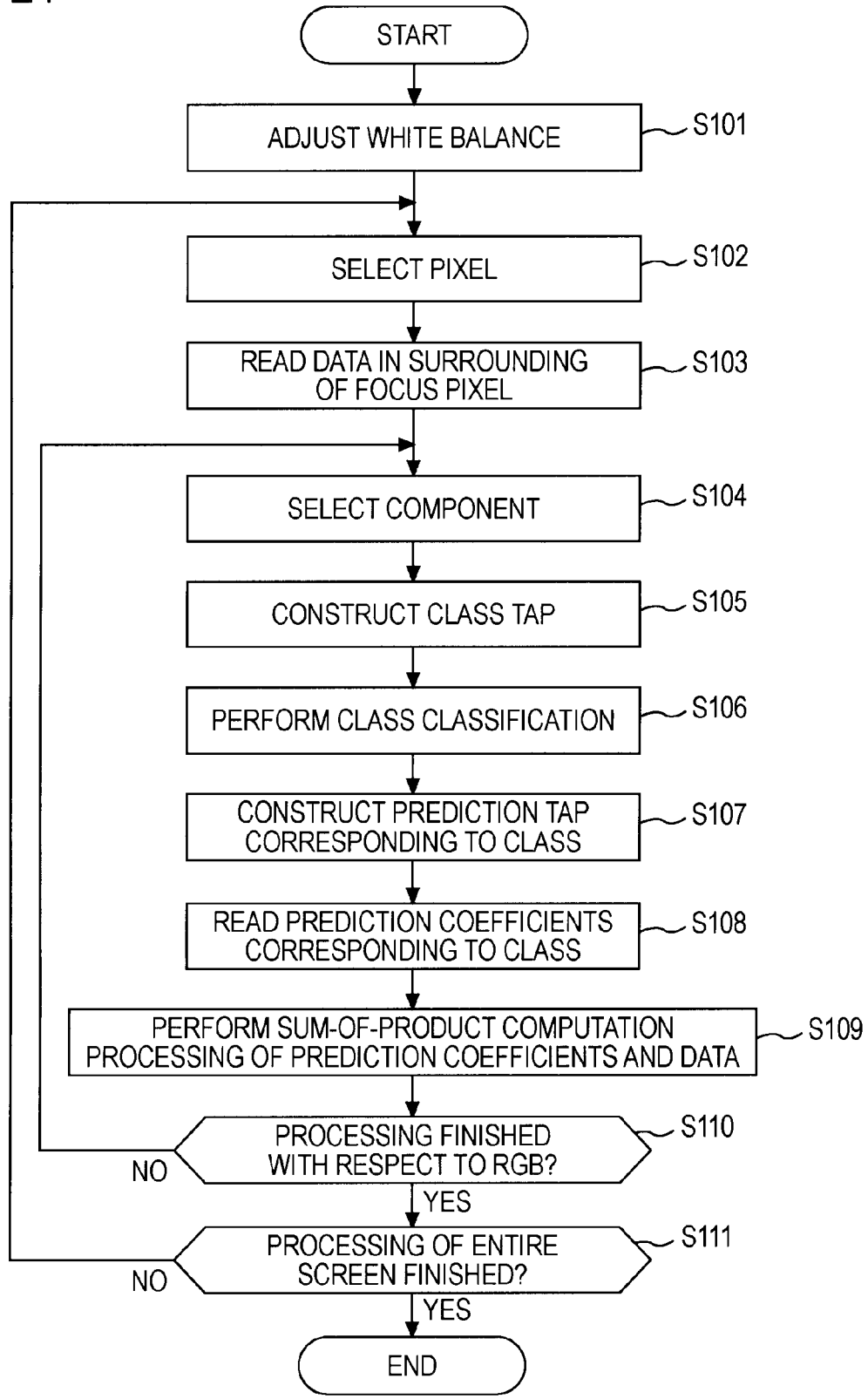
FIG. 21 is a flow chart showing an example of signal processing as class classification adaptive processing by the signal processing section.

Next, referring to the flow chart in FIG. 21, description will be given of the signal processing by the signal processing section 13, which is class classification adaptive processing using coefficients for individual classes determined in advance. In step S101, the white balance adjusting section 71 adjusts the white balance of the outputs of the pixels S1, S2, S3, and S4 of the sensor section 11.

In step S102, the class tap constructing section 101 selects a focus pixel, that is, the pixel to be generated. In step S103, the class tap constructing section 101 reads data in the surrounding of the focus pixel. That is, in step S103, the class tap constructing section 101 reads the outputs of the pixels S1, S2, S3, and S4 in the surrounding of the focus pixel.

In step S104, the class tap constructing section 101 selects the component of the focus pixel to be generated. For example, in step S104, the class tap constructing section 101 selects one of RGB.

In step S105, the class tap constructing section 101 constructs a class tap corresponding to the focus pixel. In step S106, the class classification section 102 classifies the focus pixel into classes by the class tap. In step S107, the prediction tap constructing section 104 constructs a prediction tap corresponding to the class into which the focus pixel has been classified.

In step S108, of the prediction coefficients for individual classes accumulated in advance, the coefficient accumulating section 103 reads the prediction coefficients corresponding to the classes into which the focus pixel has been classified, and supplies them to the sum-of-product computing section 105. In step S109, the sum-of-product computing section 105 carries out sum-of-product computation processing represented by Expression (4) between the data of the prediction tap constructed in step S107, and the prediction coefficients w read in step S108.

In step S110, the class tap constructing section 101 determines whether or not processing has been finished with respect to the RGB of the focus pixel. If it is determined that processing has not been finished with respect to the RGB, the process returns to step S104, and the above-described processing is repeated with respect to the next component.

If it is determined in step S110 that processing has been finished with respect to the RGB, the process advances to step S111 where the class tap constructing section 101 determines whether or not processing of the entire screen has been finished. If it is determined that processing of the entire screen has not been finished, the process returns to step S102, and the above-described processing is repeated with respect to the next pixel to be generated.

If it is determined in step S111 that processing of the entire screen has been finished, the RGB signal obtained by signal processing is outputted, and the processing ends.

In this way, a deviation between the spectral characteristics obtained from the differences between the pixels of the sensor section 11, and the final target color matching functions is corrected, thereby making it possible to capture an image with more accurate color reproduction.

Further, the color image signal obtained by the class classification adaptive processing may be subjected to white balance adjustment.

Figure 22:
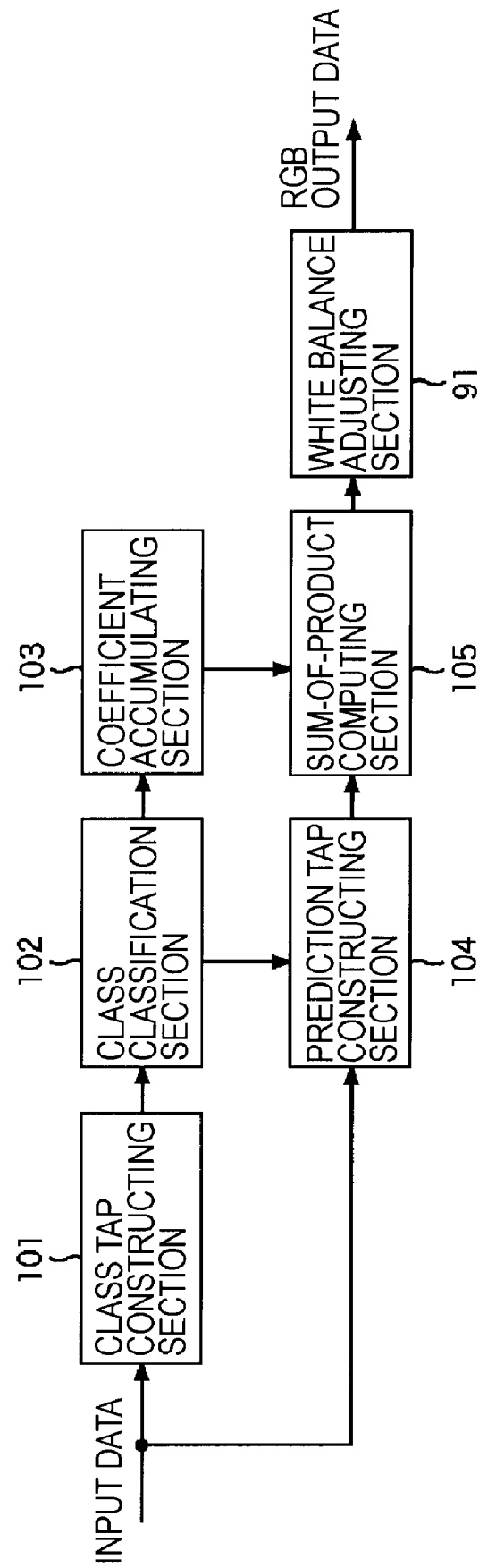
FIG. 22 is a block diagram showing still another example of the configuration of the signal processing section.

FIG. 22 is a block diagram showing still another example of the configuration of the signal processing section 13. In FIG. 22, the portions that are identical to those shown in FIG. 17 are denoted by the same reference numerals, and description thereof is omitted.

The signal processing section 13 shown in FIG. 22 includes the class tap constructing section 101, the class classification section 102, the coefficient accumulating section 103, the prediction tap constructing section 104, the sum-of-product computing section 105, and the white balance adjusting section 91.

The white balance adjusting section 91 shown in FIG. 22 adjusts the white balance of a color image signal obtained by class classification adaptive processing. That is, the white balance adjusting section 91 adjusts the white balance of the RGB signal generated by signal processing corresponding to class classification adaptive processing in the class tap constructing section 101, the class classification section 102, the coefficient accumulating section 103, the prediction tap constructing section 104, and the sum-of-product computing section 105.

Figure 23:
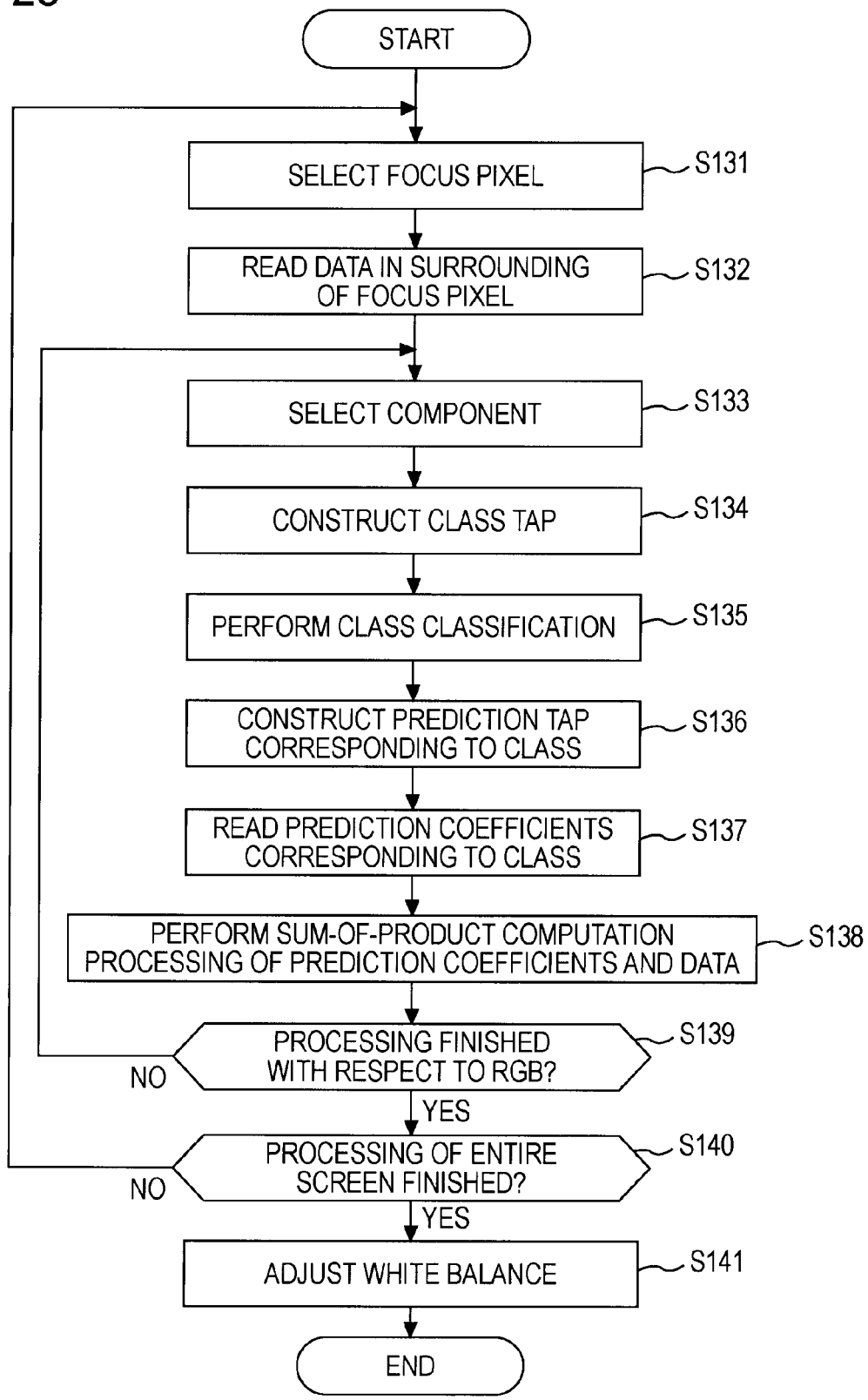
FIG. 23 is a flow chart showing another example of signal processing as class classification adaptive processing by the signal processing section.

FIG. 23 is a flow chart showing another example of the signal processing by the signal processing section 13, which is class classification adaptive processing. Since steps S131 to S140 are identical to steps S102 to S111, description thereof is omitted.

In step S141, the white balance adjusting section 91 adjusts the white balance of the RGB signal generated by the signal processing in steps S131 to S140 which is class classification adaptive processing, and outputs the white-balance-adjusted RGB signal. Then, the processing ends.

In this way, the white balance can be adjusted either before or after the signal processing corresponding to class classification adaptive processing.

Next, description will be given of how the prediction coefficients for individual classes, which are used in the class classification adaptive processing, are generated.

Figure 24:
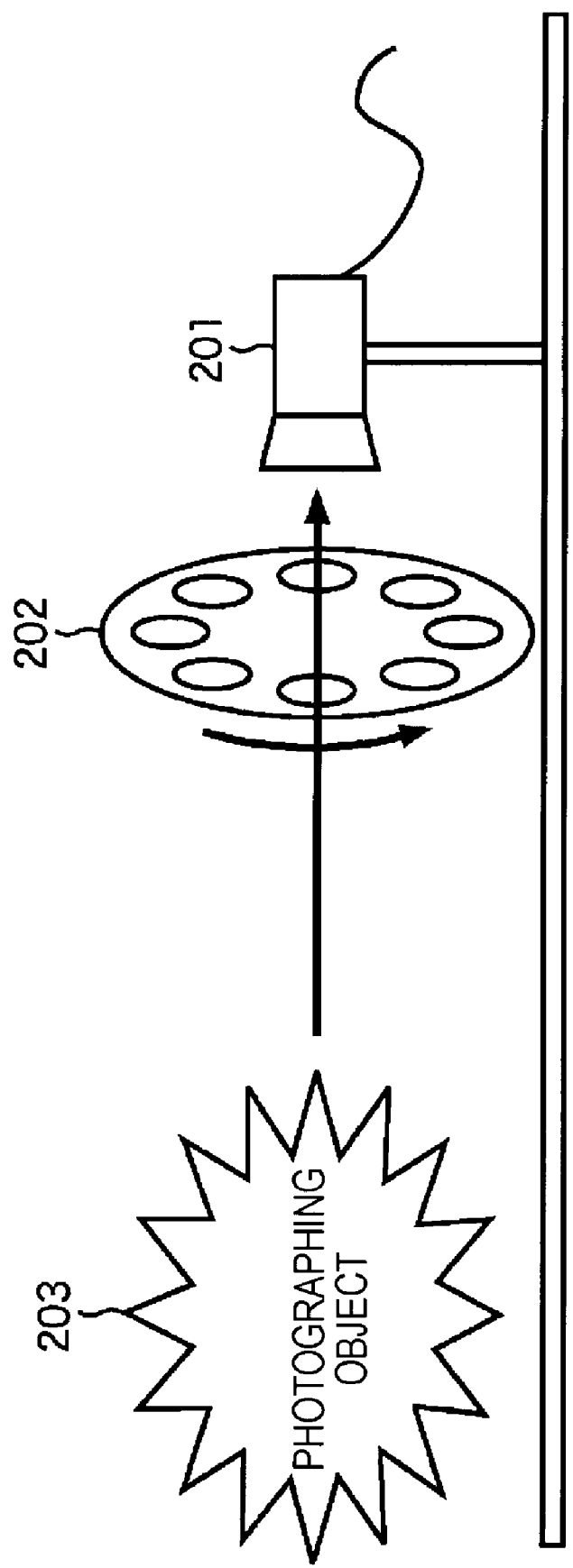
FIG. 24 is a view showing an imaging apparatus for capturing a teacher image and a student image.

FIG. 24 is a view showing an imaging apparatus for capturing a teacher image and a student image used for the generation of the prediction coefficients for individual classes used in the class classification adaptive processing. The imaging apparatus shown in FIG. 24 includes a black-and-white camera 201 and a filter wheel 202, and images a photographing object 203.

The black-and-white camera 201 has a characteristic equal to the black-and-white spectral characteristic $W(\lambda)$ of the sensor spectral sensitivity 33 shown in FIG. 4. That is, the black-and-whit camera 201 has a photoelectric conversion characteristic that is the same as the photoelectric conversion characteristic of the sensor section 11 excluding the infrared-cut filter 31 and the color filter 32.

The filter wheel 202 includes a plurality of filters. The filter wheel 202 is configured such that the optical image of the photographing object 203 that has transmitted through one of the filters is formed on the black-and-white camera 201.

The black-and-white camera 201 images a subject in units of frames so that the cycle in which a frame is imaged by the black-and-white camera 201, and the cycle in which the optical image of the photographing object 203 that has transmitted through one of the filters of the filter wheel 202 is formed on the black-and-white camera 201 are synchronized with each other, and the filter wheel 202 rotates. That is, the black-and-white camera 201 captures, on a frame-by-frame basis, the optical images of the photographing object 203 that have transmitted through the respective filters sequentially provided in the direction of rotation of the filter wheel 202.

More specifically, the black-and-white camera 201 captures, as the first frame, the optical image of the photographing object 203 that has transmitted through the first predetermined one of the filters of the filter wheel 202. Then, the black-and-white camera 201 captures, as the second frame, the optical image of the photographing object 203 that has passed through a filter provided next to the above-mentioned first filter, that is, the second filter provided in the direction of rotation of the filter wheel 202. By repeating the above-mentioned operation, in which the optical image of the photographing object 203 that has passed through one of n filters sequentially provided in the direction of rotation of the filter wheel 202 is captured as one frame, the optical images of the photographing object 203 that have respectively passed through the n filters provided in the filter wheel 202 are captured as n frames.

That is, the black-and-white camera 201 captures the images for individual colors of the filters provided in the filter wheel 202.

For example, when a color image signal having spectral characteristics more approximate to the color matching functions in the XYZ calorimetric system is to be obtained, of the filters of the filter wheel 202, the respective spectral characteristics of three filters are set as a spectral characteristic equal to the color matching function of X, a spectral characteristic equal to the color matching function of Y, and a spectral characteristic equal to the color matching function of Z in the XYZ calorimetric system. Further, of the filters of the filter wheel 202, the respective spectral characteristics of the other four filters are set as spectral characteristics equal to the respective spectral characteristics of the pixels S1, S2, S3, and S4 described above with reference to FIG. 8.

Further, for example, when a color image signal having spectral characteristics more approximate to the color matching functions in the sRGB calorimetric system is to be obtained, of the filters of the filter wheel 202, the respective spectral characteristics of three filters are set as a spectral characteristic equal to the color matching function of X, a spectral characteristic equal to the color matching function of Y, and a spectral characteristic equal to the color matching function of Z in the XYZ calorimetric system, so a color image signal having spectral characteristics more approximate to the color matching functions in the XYZ calorimetric system is thus captured once. Thereafter, the color image signal having the spectral characteristics more approximate to the color matching functions in the XYZ calorimetric system are transformed into a color image signal having spectral characteristics more approximate to the color matching functions in the sRGB system. In this case as well, of the filters of the filter wheel 202, the respective spectral characteristics of the other four filters are set as spectral characteristics equal to the respective spectral characteristics of the pixels S1, S2, S3, and S4 described above with reference to FIG. 8.

That is, of the filters of the filter wheel 202, the spectral characteristic of each of three filters is set as a spectral characteristic equal to one of the color matching functions in an arbitrary calorimetric system in which all the spectral characteristics become positive. A color image having spectral characteristics more approximate to the color matching functions in that calorimetric system is thus capture. When a color image signal having spectral characteristics more approximate to the color matching functions having negative sensitivity is to be obtained, the signal of the photographed color image is transformed by linear transformation into a color image signal having spectral characteristics more approximate to color matching functions having negative sensitivity.

The filter of the filter wheel 202 is for example, a glass filter. Since a glass filter is free from the constraints imposed by the necessity of mounting on a photoelectric conversion element as in the case of the color filter 32 provided on the sensor section 11, the spectral characteristics of the glass filter can be designed relatively freely. For example, pigments for obtaining desired spectral characteristics can be used for the filter of the filter wheel 202 without regard to such factors as the density, film thickness limit, light resistance, and heat resistance. Further, for example, one filter of the filter wheel 202 may be formed by overlapping a plurality of filters.

By providing the filter wheel 202 separately from the black-and-white camera 201 in this way, it is possible to photograph a color image having spectral characteristics more approximate to the color matching functions of a desired calorimetric system, which cannot be realized with the color filter 32 that is mounted on a photoelectric conversion element.

The black-and-white camera 201 supplies the photographed student and teacher images, which represent the images for the individual colors of the filters of the filter wheel 202, to an image processing apparatus that generates the prediction coefficients for individual classes used in the class classification adaptive processing.

It should be noted that in accordance with the phase of the pixel to be finally generated in the imaging apparatus shown in FIG. 3, a student image, and a teacher image whose pixel position is shifted with respect to the student image may be captured.

Further, a teacher image may be captured with the optical LPF (Low Pass Filter) detached.

Figure 25:
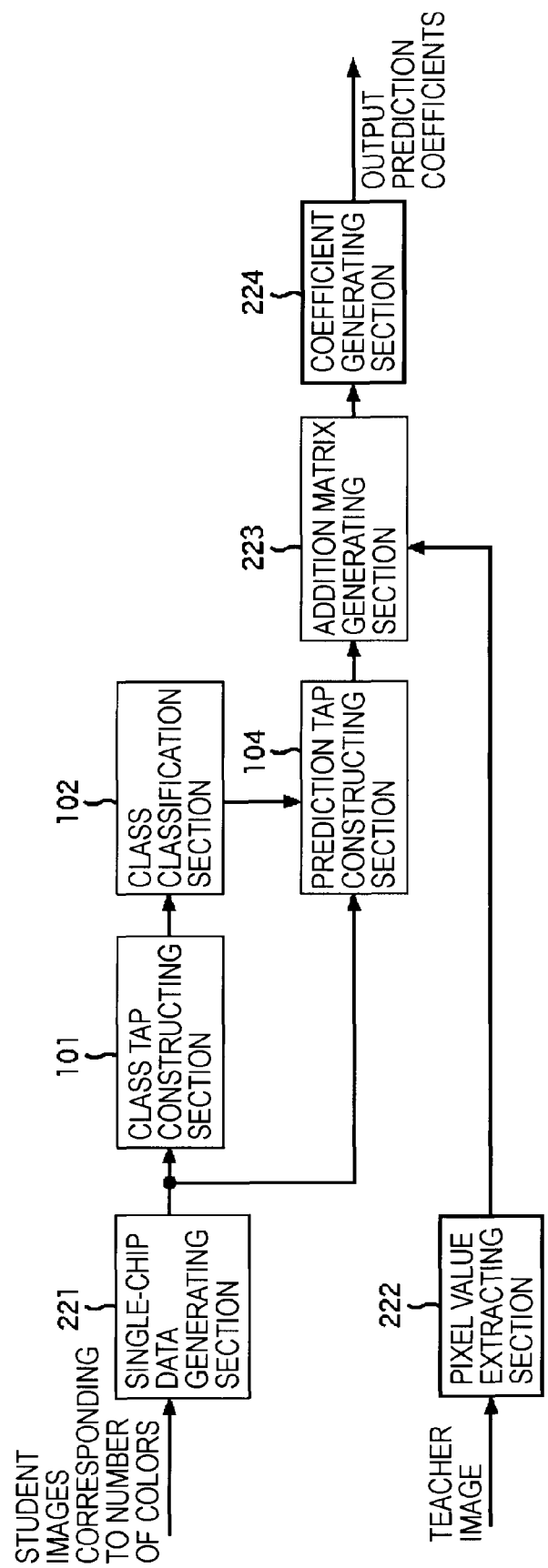
FIG. 25 is a block diagram showing an example of the configuration of an image processing apparatus that generates prediction coefficients.

FIG. 25 is a block diagram showing an example of the configuration of an image processing apparatus that generates, from a student image and a teacher image captured by the black-and-white camera 201, the prediction coefficients for individual classes used in the class classification adaptive processing. In FIG. 25, the portions that are identical to those shown in FIG. 17 are denoted by the same reference numerals, and description thereof is omitted.

The image processing apparatus for generating the prediction coefficients for individual classes used in the class classification adaptive processing includes the class tap constructing section 101, the class classification section 102, the prediction tap constructing section, a signal-chip data generating section 221, a pixel value extracting section 222, an addition matrix generating section 223, and a coefficient generating section 224.

The single-chip data generating section 221 acquires student images corresponding to the number of colors of the color filters of the sensor section 11, that is, four student images captured via filters with spectral characteristics equal to the respective spectral characteristics of the pixels S1, S2, S3, and S4. From the acquired student images, the single-chip data generating section 221 generates the same data as the data outputted from the sensor section 11. That is, the single-chip data generating section 221 generates, from the acquired student images, data having the same arrangement as the arrangement of the data outputted from the sensor section 11.

More specifically, the single-chip data generating section 221 thins out or interpolates the pixels of the acquired student images in accordance with the arrangement of the pixels S1, S2, S3, and S4 in the sensor section 11, thereby generating data having the same arrangement as the arrangement of the data outputted from the sensor section 11. For example, the single-chip data generating section 221 extracts a pixel at the position of the pixel S1 shown in FIG. 5 from a student image captured via a filter with a spectral characteristic equal to the spectral characteristic of the pixel S1, and places the pixel at the position of the pixel S1 shown in FIG. 5 with respect to the data to be generated. Further, the single-chip data generating section 221 extracts a pixel at the position of the pixel S2 shown in FIG. 5 from a student image captured via a filter with a spectral characteristic equal to the spectral characteristic of the pixel S2, and places the pixel at the position of the pixel S2 shown in FIG. 5 with respect to the data to be generated. Further, the single-chip data generating section 221 extracts a pixel at the position of the pixel S3 shown in FIG. 5 from a student image captured via a filter with a spectral characteristic equal to the spectral characteristic of the pixel S3, and places the pixel at the position of the pixel S3 shown in FIG. 5 with respect to the data to be generated. Furthermore, the single-chip data generating section 221 extracts a pixel at the position of the pixel S4 shown in FIG. 5 from a student image captured via a filter with a spectral characteristic equal to the spectral characteristic of the pixel S4, and places the pixel at the position of the pixel S4 shown in FIG. 5 with respect to the data to be generated.

In this way, the single-chip data generating section 221 generates the same data as the data outputted from the sensor section 11, from the acquired student images.

The single-chip data generating section 221 supplies the generated data to the class tap constructing section 101 and the prediction tap constructing section 104 as the final student image.

The prediction tap constructing section 104 constructs a prediction tap corresponding to the class of a focus pixel from the student image supplied from the single-chip data generating section 221, and supplies the prediction tap to the addition matrix generating section 223.

The pixel value extracting section 222 extracts from a teacher image the pixel value of a pixel at the position corresponding to a focus pixel, and supplies the pixel value of the extracted pixel to the addition matrix generating section 223. In this case, the pixel value is extracted from the teacher image corresponding to the selected component.

The addition matrix generating section 223 adds the prediction tap and the pixel value of the focus pixel to the normal equation of Expression (10) for each individual class and component.

For a large number of teacher images and student images corresponding to the teacher images, with respect to a focus pixel corresponding to a pixel of each of the teacher images, the prediction tap, and the pixel value of the pixel of the teacher image at the position corresponding to the focus pixel are added to the normal equation of Expression (1) for each individual class and component.

The addition matrix generating section 223 supplies to the coefficient generating section 224 the normal equation of Expression (10) for each individual class and component, to which the prediction tap and the pixel value of the pixel of the teacher image at the position corresponding to the focus pixel are added as described above.

The coefficient generating section 224 solves the normal equation of Expression (10) for each individual class and component, which is supplied from the addition matrix generating section 223, by sweep method of the like, thereby generating the prediction coefficients for each individual class and component. The prediction coefficients generated by the prediction coefficient generating section 224 are outputted and accumulated in the coefficient accumulating section 103.

Figure 26:
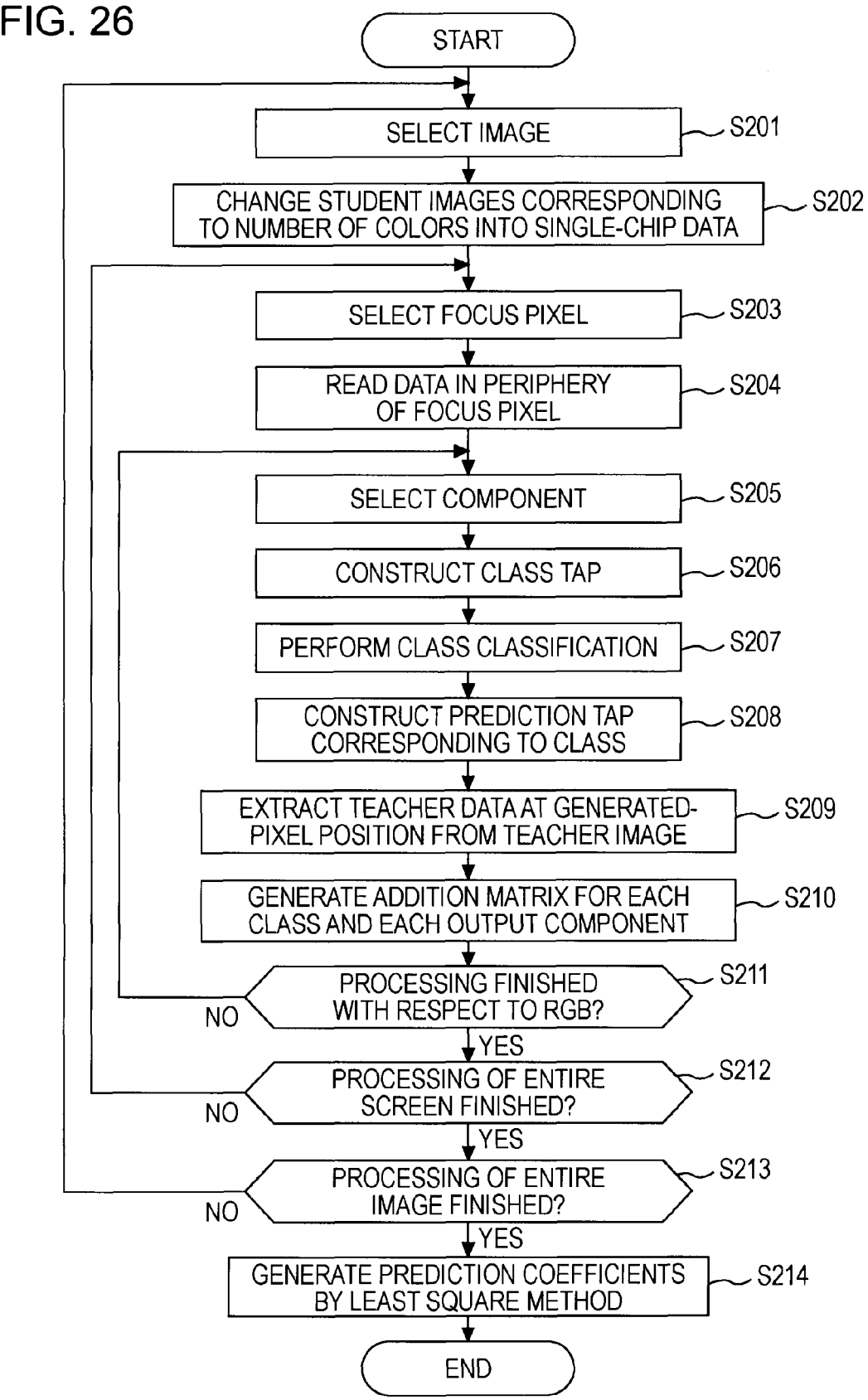
FIG. 26 is a flow chart illustrating the processing for generating prediction coefficients.

FIG. 26 is a flow chart illustrating the processing of generating the prediction coefficients for individual classes used in the class classification adaptive processing. In step S201, the single-chip data generating section 221 and the pixel value extracting section 222 select student images corresponding to the number of colors, and corresponding teacher images for the number of colors. In step S202, the single-chip data generating section 221 changes the student images corresponding to the number of colors into single-chip data according to pixel positions, thereby generating the final student image.

In step S203, the class tap constructing section 101 selects a focus pixel representing a pixel to be focused and corresponding to the pixel of the teacher image. In step S204, the class tap constructing section 101 reads data in the surrounding of the focus pixel from the student image.

In step S205, the class tap constructing section 101 selects the component of the focus pixel to be generated.

In step S206, the class tap constructing section 101 constructs a class tap corresponding to the focus pixel from the student mage. In step S207, the class classification section 102 classifies the focus pixel into classes by the class tap. In step S208, the prediction tap constructing section 104 constructs a prediction tap corresponding to the class to which the focus pixel has been classified.

In step S208, the pixel value extracting section 222 extracts, from the teacher image, the generated-pixel position, that is, the teacher data (pixel value of a pixel) at the position corresponding to the focus pixel. In this case, the pixel value of the teacher image of the color corresponding to the component selected in step S205 is extracted.

In step S210, the addition matrix generating section 223 generates an addition matrix for each class and each component. For example, in step S210, the addition matrix generating section 223 adds the prediction tap and the pixel value of the pixel of the teacher image at the position corresponding to the focus pixel, to the normal equation of Expression (10) for each class and each component.

In step S211, the class tap constructing section 101 determines whether or not processing has been finished with respect to all of the components, that is, RGB, of that focus pixel. If it is determined that processing has not been finished with respect to RGB, the process returns to step S205, and the above-described processing is repeated with respect to the next component.

If it is determined in step S211 that processing has been finished with respect to RGB, the process advances to step S212, and the class tap constructing section 101 determines whether or not processing of the entire screen has been finished. If it is determined that processing of the entire screen has not been finished, the process returns to step S203, and the above-described processing is repeated with respect to the next focus pixel.

If it is determined in step S212 that processing of the entire screen has been finished, the process advances to step S213, and the class tap constructing section 101 determines whether or not processing of the entire image has been finished. If it is determined in step S213 that processing of the entire image has not been finished, the process returns to step S201, and the above-described processing is repeated with respect to the next image.

If it is determined in step S213 that processing of the entire image has been finished, the process advances to step S214 where the coefficient generating section 224 generates prediction coefficients by the least square method, and the processing ends. That is, in step S214, the coefficient generating section 224 solves the addition matrix for each class and each component, which is generated in step S210, thereby generating the prediction coefficients for each class and each component.

In this way, the prediction coefficients for individual classes used in the class classification adaptive processing are generated.

According to the present invention, when performing color photographing using a single-chip imaging device (photoelectric conversion element), the imaging device and signal processing are configured in a distinctive way while considering all the factors ranging from the imaging device to signal processing in their totality, thereby achieving improved color reproducibility and wider color gamut for the data of the image that is finally outputted.

Further, even when a plurality of imaging devices are used, the same effect can be attained by adopting the above-described configuration for the respective imaging devices, thereby achieving a further improvement in overall characteristics. For example, the pixels S4 and S1 are arranged adjacent to the first one of the plurality of imaging devices, the pixels S4 and S2 are arranged adjacent to the second one of the plurality of imaging devices, and the pixels S4 and S3 are arranged adjacent to the third one of the plurality of imaging devices.

Through application of the present invention as described above, it is possible to obtain image data that involves less color distortion in comparison to the related art while realizing higher definition at the same time. Accordingly, for example, an image more approximate to the image as actually perceived by the human eyes can be presented as the output of a display, a printer, or the like. Since the color gamut of output devices tends to become increasingly wider in recent years, it is expected that the ability to acquire data with greater accuracy and wider color gamut at the time of imaging will be seen as increasingly valuable in the future.

Further, even in the case of an output device with a limited color gamut, if data with a wide color gamut can be acquired at the time of imaging, by applying appropriate corrections adapted to the output device later, the optimum image as can be realized by the characteristics of that output device is presented.

Further, the present invention also proves advantageous for use in the fields where more faithful color reproduction is required, such as various design and medical fields as represented by a copier, remote medical equipment, and the like.

The present invention can be applied to equipment endowed with an imaging function, such as a digital still camera, a digital video camera, a portable telephone with an imaging function, a PDA with an imaging function, a copier, and remote medical equipment.

As described above, a color image can be captured when a color filter are provided to the photoelectric conversion section. Further, when pixels for approximating one of the color matching functions representing the sensitivity of the human eye to color by the spectral sensitivity represented as the difference between their outputs, are placed at predetermined adjacent positions of the photoelectric conversion section, and signal processing for converting a pixel output into a color image signal is applied to the output of the photoelectric conversion section, an image with more accurate color reproduction can be captured.

When pixels for approximating one of the color matching functions representing the sensitivity of the human eye to color by the spectral sensitivity represented as the difference between their outputs, are placed at predetermined adjacent positions, an image with more accurate color reproduction can be captured.

Figure 27:
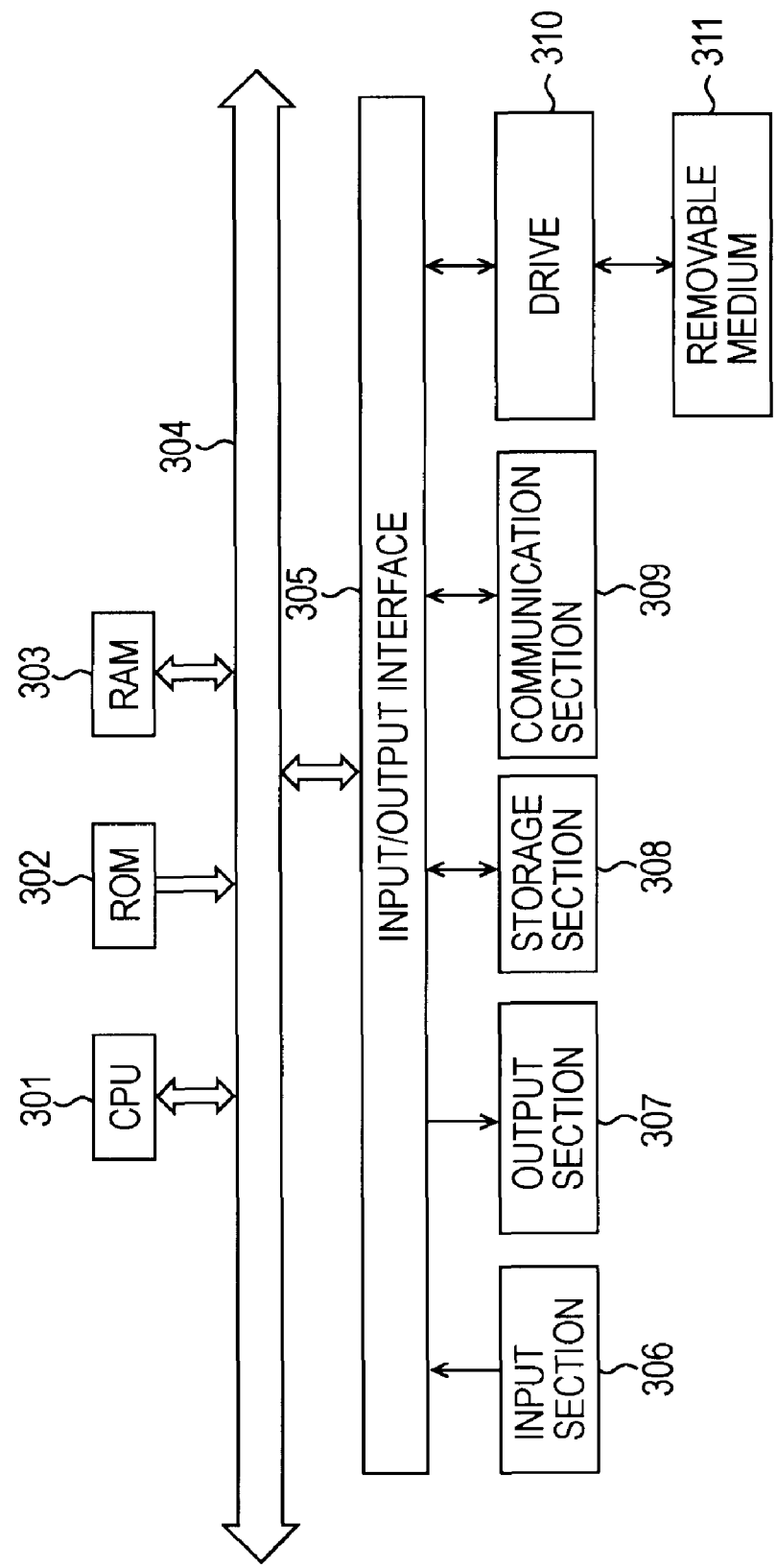
FIG. 27 is a block diagram showing an example of the configuration of a personal computer.

FIG. 27 is a block diagram showing an example of the configuration of a personal computer that executes the series of processing described above by a program. A CPU (Central Processing Unit) 301 executes various kinds of processing on the basis of a program stored in a ROM (Read Only Memory) 302 or a storage section 308. A program to be executed by the CPU 301, data, and the like are stored in a RAM (Random Access Memory) 303 as appropriate. The CPU 301, the ROM 302, and the RAM 303 are connected to each other via a bus 304.

An input/output interface 305 is also connected to the CPU 301 via the bus 304. An input section 306 formed by a key board, a mouse, a microphone, and the like, and an output section 307 formed by a display, a speaker, and the like are connected to the input/output interface 305. The CPU 301 executes various kinds of processing in response to commands inputted from the input section 306. Then, the CPU 301 outputs the processing result to the output section 307.

The storage section 308 connected to the input/output interface 305 is formed by, for example, a hard disk, and stores a program to be executed by the CPU 309 and various kinds of data. A communication section 309 communicates with an external apparatus via a network such as the Internet or the local area network.

Further, a program may be acquired via the communication section 309 and stored into the storage section 308.

When loaded with a removable medium 311 such as a magnetic disc, an optical disc, a semiconductor memory, or the like, a drive 310 connected to the input/output interface 305 drives the removable medium 311, and acquires a program or data recorded in the removable medium 311. The acquired program or data is transferred and stored into the storage section 308 as required.

The series of processing described above can be executed by hardware or software. When executing the series of processing by software, a program constituting the software is installed from a program recording medium into a computer incorporated in dedicated hardware or, for example, a general-purpose computer capable of executing various functions by installing various programs, or the like.

As shown in FIG. 27, the program recording medium for storing a program that can be executed by a computer by being installed into the computer, is constituted by the removable medium 311 as a package medium including a magnetic disk (including a flexible disk), an optical disk (CD-ROM (Compact Disc-Read Only Memory), a DVD (Digital versatile Disc), a semiconductor memory, or the like, the ROM 302 in which the program is temporarily or permanently stored, hardware constituting the storage section 308, or the like. The storing of a program into a program recording medium is performed by using a wired or wireless communication medium, such as the local area network, the Internet, or digital satellite broadcasting, via the communication section 309 serving as an interface such as a router or a modem as required.

It should be noted that in this specification, examples of the steps describing a program stored in a program recording medium include not only processes that are executed time sequentially in the order as they appear in the description but also processes that may not be necessarily executed time sequentially but are executed in parallel or independently.

It should be noted that the embodiment of the present invention is not limited to the above-described embodiment but can be modified in various ways without departing from the scope of the present invention.

What is claimed is:

1. An imaging apparatus comprising:
    imaging means for approximating one of color matching functions representing sensitivity of the human eye to color by a spectral sensitivity that is obtained as a difference in output between, from among mutually adjacent photoelectric conversion elements, the photoelectric conversion elements arranged at predetermined positions, the imaging means having the photoelectric conversion elements arranged at the predetermined positions,
    wherein a spectral sensitivity obtained as a difference between outputs of a first photoelectric conversion element and a second photoelectric conversion element of four photoelectric conversion elements arranged adjacent to each other vertically and horizontally on the imaging means approximates a first color matching function of color matching functions for three primary colors of light,
    a spectral sensitivity obtained as a difference between outputs of a third photoelectric conversion element and the first photoelectric conversion element of the four photoelectric conversion elements approximates a second color matching function of color matching functions for three primary colors of light, and
    a spectral sensitivity obtained as a difference between outputs of a fourth photoelectric conversion element and the first photoelectric conversion element of the four photoelectric conversion elements approximates a third color matching function of color matching functions for three primary colors of light; and
    signal processing means for applying to an output of the imaging means signal processing for converting an output of a photoelectric conversion element into a signal of a color image.

2. The imaging apparatus according to claim 1, wherein the imaging means includes units arranged side by side vertically or horizontally, the units each including the first photoelectric conversion element, the second photoelectric conversion element, the third photoelectric conversion element, and the fourth photoelectric conversion element that are arranged adjacent to each other vertically and horizontally.

3. The imaging apparatus according to claim 2, wherein the signal processing means includes:
    first calculating means for calculating, for each one of the first photoelectric conversion elements and with respect to the second photoelectric conversion element, the third photoelectric conversion element, and the fourth photoelectric conversion element that are adjacent to the first photoelectric conversion element, a difference between an output of the first photoelectric conversion element and an output of the second photoelectric conversion element, a difference between an output of the first photoelectric conversion element and an output between the third photoelectric conversion element, and a difference between an output of the first photoelectric conversion element and an output of the fourth photoelectric conversion element;
    determining means for determining a position of a pixel of a color image whose pixel value is to be calculated, from among positions shifted to the upper left, lower left, upper right, and lower right with respect to a position of the first photoelectric conversion element by half a distance of two photoelectric conversion elements in the imaging means; and
    second calculating means for calculating a pixel value of a pixel of a color image by performing, in accordance with a determination result, a weighted average between a difference calculated from an output of the first photoelectric conversion element that is shifted by half the distance with respect to a position of the pixel of the color image, and a difference calculated from an output of another one of the first photoelectric conversion elements which belongs to another unit adjacent to a unit to which the first photoelectric conversion element belongs.

4. The imaging apparatus according to claim 1, wherein the imaging means has arranged thereon photoelectric conversion elements from which a spectral sensitivity that approximates one of color matching functions for RGB is outputted on the basis of a difference in output between the photoelectric conversion elements.

5. The imaging apparatus according to claim 1, wherein the imaging means has arranged thereon photoelectric conversion elements from which a spectral sensitivity that approximates one of color matching functions in an XYZ calorimetric system is outputted on the basis of a difference in output between the photoelectric conversion elements.

6. The imaging apparatus according to claim 1, wherein the signal processing means applies signal processing to an output of the imaging means, the signal processing including calculating, as a signal of a color image, a difference between outputs of photoelectric conversion elements arranged at predetermined positions, from among photoelectric conversion elements arranged adjacent to each other on the imaging means.

7. The imaging apparatus according to claim 1, wherein the signal processing means applies signal processing to an output of the imaging means, the signal processing being class classification adaptive processing using coefficients for individual classes found in advance.

8. The imaging apparatus according to claim 1, further comprising adjusting means for adjusting a white balance of an output of a photoelectric conversion element of the imaging means.

9. The imaging apparatus according to claim 1, further comprising adjusting means for adjusting a white balance of a signal of a color image obtained by signal processing.

10. An imaging method comprising:
arranging photoelectric conversion elements at predetermined adjacent positions of the imaging means;
approximating one of color matching functions representing sensitivity of the human eye to color by a spectral sensitivity obtained as a difference in output between the photoelectric conversion elements, the approximating including generating the color matching functions which provide a spectral characteristic for a range of visible wavelengths, the spectral characteristic for each color matching function having a negative value for at least one visible wavelength; and
applying to an output of the imaging means signal processing for converting an output of a photoelectric conversion element into a signal of a color image,
wherein a spectral sensitivity obtained as a difference between outputs of a first photoelectric conversion element and a second photoelectric conversion element of four photoelectric conversion elements arranged adjacent to each other vertically and horizontally on the imaging means approximates a first color matching function of color matching functions for three primary colors of light,
a spectral sensitivity obtained as a difference between outputs of a third photoelectric conversion element and the first photoelectric conversion element of the four photoelectric conversion elements approximates a second color matching function of color matching functions for three primary colors of light, and
a spectral sensitivity obtained as a difference between outputs of a fourth photoelectric conversion element and the first photoelectric conversion element of the four photoelectric conversion elements approximates a third color matching function of color matching functions for three primary colors of light.

11. An imaging device comprising:
photoelectric conversion elements arranged at predetermined adjacent positions, the photoelectric conversion elements approximating one of color matching functions representing sensitivity of the human eye to color by a spectral sensitivity obtained as a difference in output between the photoelectric conversion elements,
wherein a spectral sensitivity obtained as a difference between outputs of a first photoelectric conversion element and a second photoelectric conversion element of four photoelectric conversion elements arranged adjacent to each other vertically and horizontally approximates a first color matching function of color matching functions for three primary colors of light,
a spectral sensitivity obtained as a difference between outputs of a third photoelectric conversion element and the first photoelectric conversion element of the four photoelectric conversion elements approximates a second color matching function of color matching functions for three primary colors of light, and
a spectral sensitivity obtained as a difference between outputs of a fourth photoelectric conversion element and the first photoelectric conversion element of the four photoelectric conversion elements approximates a third color matching function of color matching functions for three primary colors of light.

12. The imaging device according to claim 11, wherein the imaging device includes units arranged side by side vertically or horizontally, the units each including the first photoelectric conversion element, the second photoelectric conversion element, the third photoelectric conversion element, and the fourth photoelectric conversion element that are arranged adjacent to each other vertically and horizontally.

13. An imaging apparatus comprising:
an imaging section configured to approximate one of color matching functions representing sensitivity of the human eye to color by a spectral sensitivity that is obtained as a difference in output between, from among mutually adjacent photoelectric conversion elements, the photoelectric conversion elements arranged at predetermined positions, the imaging section having the photoelectric conversion elements arranged at the predetermined positions; and
a signal processing section configured to apply to an output of the imaging section signal processing for converting an output of a photoelectric conversion element into a signal of a color image,
wherein a spectral sensitivity obtained as a difference between outputs of a first photoelectric conversion element and a second photoelectric conversion element of four photoelectric conversion elements arranged adjacent to each other vertically and horizontally on the imaging means approximates a first color matching function of color matching functions for three primary colors of light,
a spectral sensitivity obtained as a difference between outputs of a third photoelectric conversion element and the first photoelectric conversion element of the four photoelectric conversion elements approximates a second color matching function of color matching functions for three primary colors of light, and
a spectral sensitivity obtained as a difference between outputs of a fourth photoelectric conversion element and the first photoelectric conversion element of the four photoelectric conversion elements approximates a third color matching function of color matching functions for three primary colors of light.

* * * * *